(12) United States Patent
Koyama et al.

(10) Patent No.: US 10,688,463 B2
(45) Date of Patent: Jun. 23, 2020

(54) AQUEOUS DISPERSION, METHOD FOR PRODUCING THE SAME, AND IMAGE-FORMING METHOD

(71) Applicant: FUJIFILM CORPORATION, Minato-ku, Tokyo (JP)

(72) Inventors: Ichiro Koyama, Kanagawa (JP); Noriaki Sato, Kanagawa (JP); Shota Suzuki, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/442,548

(22) Filed: Jun. 17, 2019

(65) Prior Publication Data

US 2019/0308156 A1    Oct. 10, 2019

Related U.S. Application Data

(63) Continuation of application No. PCT/JP2017/041729, filed on Nov. 20, 2017.

(30) Foreign Application Priority Data

Dec. 27, 2016    (JP) ................. 2016-252731

(51) Int. Cl.
| | |
|---|---|
| B01J 13/14 | (2006.01) |
| B41J 11/00 | (2006.01) |
| C08G 18/32 | (2006.01) |
| C08G 18/48 | (2006.01) |
| C08G 18/76 | (2006.01) |
| C09D 11/30 | (2014.01) |
| B41M 5/00 | (2006.01) |
| C08G 18/08 | (2006.01) |
| C08G 18/64 | (2006.01) |
| C08G 18/80 | (2006.01) |
| C08L 75/08 | (2006.01) |
| C08G 18/28 | (2006.01) |
| C08G 18/75 | (2006.01) |
| C08J 3/07 | (2006.01) |

(52) U.S. Cl.
CPC ............ *B01J 13/14* (2013.01); *B41J 11/002* (2013.01); *B41M 5/00* (2013.01); *C08G 18/0823* (2013.01); *C08G 18/0833* (2013.01); *C08G 18/283* (2013.01); *C08G 18/3206* (2013.01); *C08G 18/48* (2013.01); *C08G 18/6407* (2013.01); *C08G 18/755* (2013.01); *C08G 18/757* (2013.01); *C08G 18/7642* (2013.01); *C08G 18/8064* (2013.01); *C08J 3/07* (2013.01); *C08L 75/08* (2013.01); *C09D 11/30* (2013.01)

(58) Field of Classification Search
CPC ....... B01J 13/14; B41M 5/00; C08G 18/0833; C08G 18/6407; C08G 18/8064; C08G 18/283; C08G 18/755; C08G 18/0823; C08G 18/757; C08G 18/3206; C08G 18/48; C08G 18/7642; C08L 75/08; C08J 3/07; B41J 11/002; C09D 11/30
See application file for complete search history.

(56) References Cited

U.S. PATENT DOCUMENTS

| | | | |
|---|---|---|---|
| 2002/0177654 A1* | 11/2002 | Erdem | ............... C08F 257/02 524/801 |
| 2006/0240264 A1 | 10/2006 | Gertzmann et al. | |
| 2011/0069109 A1 | 3/2011 | Tojo | |
| 2014/0295152 A1 | 10/2014 | Brust et al. | |

FOREIGN PATENT DOCUMENTS

| | | |
|---|---|---|
| EP | 511457 A1 | 11/1992 |
| JP | H02-240123 A | 9/1990 |
| JP | H03-097712 A | 4/1991 |
| JP | H03-109937 A | 5/1991 |
| JP | H04-249517 A | 9/1992 |
| JP | H05-239341 A | 9/1993 |
| JP | H07-292060 A | 11/1995 |
| JP | H08-60063 A | 3/1996 |
| JP | H08-259888 A | 10/1996 |
| JP | H08-337633 A | 12/1996 |
| JP | 2006-307215 A | 11/2006 |
| JP | 2011-063001 A | 3/2011 |
| JP | 2012-246486 A | 12/2012 |
| WO | 2012/073563 A1 | 6/2012 |
| WO | 2015/158748 A1 | 10/2015 |

OTHER PUBLICATIONS

International Search Report issued in International Application No. PCT/JP2017/041729 dated Feb. 20, 2018.
Written Opinion of the ISA issued in International Application No. PCT/JP2017/041729 dated Feb. 20, 2018.
Extended European Search Report dated Sep. 9, 2019, issued in corresponding EP Patent Application No. 17886799.0.
English language translation of the following: Office action dated Nov. 12, 2019 from the JPO in a Japanese patent application No. 2018-558903 corresponding to the instant patent application.

* cited by examiner

*Primary Examiner* — Bradley W Thies
(74) *Attorney, Agent, or Firm* — SOLARIS Intellectual Property Group, PLLC

(57) ABSTRACT

An aqueous dispersion is provided, the aqueous dispersion including: a microcapsule including a core and a shell that has a three-dimensionally crosslinked structure including (a) at least one selected from the group consisting of a urethane bond and a urea bond and (b) an anionic group and a nonionic group as hydrophilic groups, in which at least one of the shell or the core has a thermal-polymerizable group; and water, in which the nonionic group is a group (W) represented by Formula (W) below,

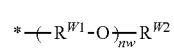

Formula (W)

in which, in Formula (W), $R^{W1}$ represents an alkylene group that has 1 to 6 carbon atoms and that may be branched, $R^{W2}$ represents an alkyl group that has 1 to 6 carbon atoms and that may be branched, nw represents an integer of 2 to 200, and * represents a linkage position.

12 Claims, No Drawings

AQUEOUS DISPERSION, METHOD FOR PRODUCING THE SAME, AND IMAGE-FORMING METHOD

CROSS-REFERENCE TO RELATED APPLICATIONS

This application is a continuation application of International Application No. PCT/JP2017/041729, filed Nov. 20, 2017, the disclosure of which is incorporated herein by reference in its entirety. Further, this application claims priority from Japanese Patent Application No. 2016-252731, filed Dec. 27, 2016, the disclosure of which is incorporated herein by reference in its entirety.

BACKGROUND OF THE INVENTION

1. Field of the Invention

The present disclosure relates to an aqueous dispersion, a method for producing the aqueous dispersion, and an image-forming method.

2. Description of the Related Art

There are known microcapsule aqueous dispersions in which microcapsules including a core and a shell are dispersed in an aqueous medium (medium including water).

For example, an ink-jet ink is disclosed in which microcapsules having a core including a photopolymerization initiator and an ultraviolet-curable compound, and a cross-linked polymer shell having a dispersing group introduced with a covalent bond are dispersed in an aqueous medium (for example, refer to WO2015/158748A).

In addition, there are disclosed, as inks that have high rubfastness and high durability and that provide high ink ejectability, inks including a binder that is an aqueous dispersion of a core-shell composite resin particles including a shell layer formed of a urethane resin having a hydrophilic group and a core layer formed of a vinyl polymer (for example, refer to WO2012/073563A and JP2012-246486A).

In addition, as an aqueous printing ink composition being suitable for lamination printing on various plastic films, having high suitability for printing, and also having adhesiveness, laminate strength, and tolerance to heat-sealing and heat sterilization treatment, there is a known aqueous printing ink composition containing a pigment, an aqueous binder resin, and water, the ink composition containing, as aqueous binder resins, (A) a crosslinked polyurethane urea resin obtained by reacting, with polyamine, isocyanate groups of an aqueous dispersion in which a self-dispersible urethane prepolymer having an isocyanate group at an end, or a mixture of this prepolymer and another polyisocyanate compound is dispersed in water, and (B) a core-shell water-dispersible resin in which an epoxy-group-containing copolymer forms the core and a carboxy-group-containing polyurethane forms the shell (for example, refer to JP1996-60063A (JP-H08-60063A)).

SUMMARY OF THE INVENTION

Aqueous dispersions of microcapsules are desirably provided such that the microcapsules have dispersion stability. In these years, various methods for forming films with aqueous dispersions of microcapsules have been studied; there has been a demand for a method for forming a film having higher hardness.

In particular, for example, when such an aqueous dispersion of microcapsules is used as an ink-jet ink (hereafter, also simply referred to as "ink"), or such an aqueous dispersion of microcapsules is used as a coating solution (namely, a coating liquid) for forming coating films, these aqueous dispersions desirably form films having higher hardness.

Regarding this point, the aqueous dispersion of microcapsules described in WO2015/158748A has room for improvements because, while the shells of the microcapsules have dispersing groups, the microcapsules do not have sufficient dispersion stability.

In addition, the aqueous dispersions of microcapsules described in WO2012/073563A, JP2012-246486A, and JP1996-60063A (JP-H08-60063A) do not have curability, and hence do not form films having high hardness.

Under the above-described circumstances, the present disclosure has been made, and an object thereof is as follows.

An object of the present disclosure is to provide an aqueous dispersion that has high dispersion stability of microcapsules and enables formation of a film having high hardness, a method for producing the aqueous dispersion, and an image-forming method employing the aqueous dispersion.

Specific means for achieving the object includes the following aspects.

<1> An aqueous dispersion including:

a microcapsule including a core and a shell that has a three-dimensionally crosslinked structure including (a) at least one selected from the group consisting of a urethane bond and a urea bond and (b) an anionic group and a nonionic group as hydrophilic groups, wherein at least one of the shell or the core has a thermal-polymerizable group; and water, wherein the nonionic group is a group (W) represented by Formula (W) below.

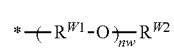

Formula (W)

In Formula (W), $R^{W1}$ represents an alkylene group that has 1 to 6 carbon atoms and that may be branched, $R^{W2}$ represents an alkyl group that has 1 to 6 carbon atoms and that may be branched, nw represents an integer of 2 to 200, and * represents a linkage position.

<2> The aqueous dispersion according to <1>, wherein the three-dimensionally crosslinked structure includes at least one of structures represented by Formulas (X1) to (X4) below.

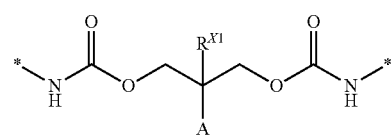

Formula (X1)

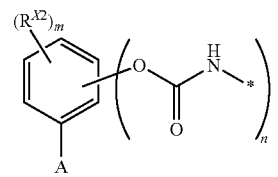

Formula (X2)

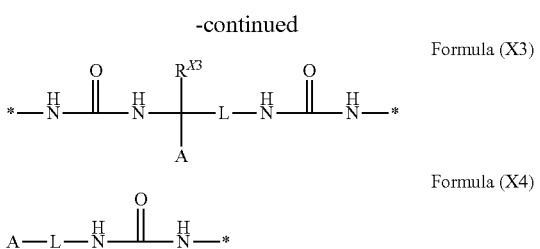

Formula (X3)

Formula (X4)

In Formula (X1), $R^{X1}$ represents a hydrogen atom or an alkyl group having 1 to 10 carbon atoms, A represents an anionic group, and * represents a linkage position.

In Formula (X2), $R^{X2}$ represents an alkyl group having 1 to 10 carbon atoms, A represents an anionic group, n represents an integer of 1 to 5, m represents an integer of 0 to 4, m and n are in total an integer of 1 to 5, and * represents a linkage position.

In Formula (X3), $R^{X3}$ represents a hydrogen atom or an alkyl group having 1 to 10 carbon atoms, A represents an anionic group, L represents a divalent linking group, and * represents a linkage position.

In Formula (X4), A represents an anionic group, L represents a divalent linking group, and * represents a linkage position.

<3> The aqueous dispersion according to <1> or <2>, wherein the anionic group is at least one of a carboxy group or a salt of a carboxy group.

<4> The aqueous dispersion according to any one of <1> to <3>, wherein an amount of the nonionic group relative to a total solid content of the microcapsule is 1 mass % to 20 mass %.

<5> The aqueous dispersion according to any one of <1> to <4>, wherein an amount of the anionic group relative to 1 g of a total solid content of the microcapsule is 0.2 mmol/g to 1.5 mmol/g.

<6> The aqueous dispersion according to any one of <1> to <5>, wherein N mass % representing an amount of the nonionic group relative to a total solid content of the microcapsule, and A mmol/g representing an amount of the anionic group relative to 1 g of the total solid content of the microcapsule satisfy a ratio of A to N of 0.02 to 0.15.

<7> The aqueous dispersion according to any one of <1> to <6>, wherein the core includes a thermal-polymerizable compound.

<8> The aqueous dispersion according to any one of <1> to <7>, wherein a content of an anionic surfactant relative to a total amount of the aqueous dispersion is 1 mass % or less.

<9> The aqueous dispersion according to any one of <1> to <8>, wherein an amount of a total solid content of the microcapsule relative to a total solid content of the aqueous dispersion is 50 mass % or more.

<10> The aqueous dispersion according to any one of <1> to <9>, being used as an ink-jet ink.

<11> A method for producing the aqueous dispersion according to any one of <1> to <10>, the method including:
mixing (a) an aqueous-phase component including water and (b) an oil-phase component including an organic solvent, a tri- or higher functional isocyanate compound, and at least one of a thermal-polymerizable-group-introduced isocyanate compound or a thermal-polymerizable compound, and performing emulsification to form the microcapsule,
wherein at least one of Condition (x-1) or Condition (x-2) below is satisfied,
Condition (x-1): the oil-phase component includes an isocyanate compound to which the nonionic group is introduced,
Condition (x-2): at least one of the oil-phase component or the aqueous-phase component includes a compound having the nonionic group and an active hydrogen group; and
wherein at least one of Condition (y-1) or Condition (y-2) below is satisfied,
Condition (y-1): the oil-phase component includes an isocyanate compound to which the anionic group is introduced,
Condition (y-2): at least one of the oil-phase component or the aqueous-phase component includes a compound having the anionic group and an active hydrogen group.

<12> An image-forming method including:
applying the aqueous dispersion according to any one of <1> to <10> onto a recording medium; and
curing the aqueous dispersion applied on the recording medium by heating or irradiation with infrared radiation.

The present disclosure provides an aqueous dispersion that enables formation of a film having high hardness and that has high dispersion stability of microcapsules, a method for producing the aqueous dispersion, and an image-forming method employing the aqueous dispersion.

DESCRIPTION OF THE PREFERRED EMBODIMENTS

Hereinafter, specific embodiments according to the present disclosure will be described in detail. However, the present disclosure is not limited to the following embodiments at all.

In this Specification, ranges defined by a value "to" a value include these values as the minimum value and the maximum value.

In this Specification, the amount of each component in a composition means, when the composition contains a plurality of substances belonging to such a component, the total amount of the plurality of substances in the composition unless otherwise specified.

In this Specification, the term "step" includes not only an independent step, but also a step that is not clearly distinguished from another step but that achieves the intended result of the step.

In this Specification, "(meth)acrylic acid" is a concept that encompasses both of acrylic acid and methacrylic acid; "(meth)acrylate" is a concept that encompasses both of acrylate and methacrylate; and "(meth)acryloyl group" is a concept that encompasses both of an acryloyl group and a methacryloyl group.

Aqueous Dispersion

The aqueous dispersion according to the present disclosure contains water and a microcapsule that includes a core and a shell that has a three-dimensionally crosslinked structure including (a) at least one selected from the group consisting of a urethane bond and a urea bond and (b) an anionic group and a nonionic group as hydrophilic groups, wherein at least one of the shell or the core has a thermal-polymerizable group, wherein the nonionic group is a group (W) represented by Formula (W) below.

Formula (W)

In Formula (W),
$R^{W1}$ represents an alkylene group that has 1 to 6 carbon atoms and that may be branched, $R^{W2}$ represents an alkyl group that has 1 to 6 carbon atoms and that may be branched, nw represents an integer of 2 to 200, and * represents a linkage position.

The aqueous dispersion according to the present disclosure enables formation of a film having high hardness, and has high dispersion stability of microcapsules.

The reason why the aqueous dispersion according to the present disclosure provides such advantages has not been clearly found. However, the inventors of the present disclosure have inferred the reason as follows.

In the aqueous dispersion according to the present disclosure, the shells of the microcapsules contained as dispersoid have a three-dimensionally crosslinked structure including an anionic group as a hydrophilic group (hereafter, also simply referred to as the "anionic group"), a nonionic group as a hydrophilic group (hereafter, also simply referred to as the "nonionic group"), and at least one selected from the group consisting of a urethane bond and a urea bond (hereafter, also referred to as the "urethane bond etc.").

When the shells of the microcapsules have both of the anionic group and the nonionic group, compared with a case where the shells have only one of the anionic group and the nonionic group, the dispersing effect due to the anionic group and the dispersing effect due to the nonionic group synergistically provide marked improvements in the dispersion stability of the microcapsules.

The shells of the microcapsules have, as the nonionic group, the above-described nonionic group that is the group (W).

Hereafter, the nonionic group that is the group (W) will also be referred to as the "specified nonionic group".

The group (W) (specified nonionic group) is a monovalent group having a polyether structure one end of which is blocked.

Compared with divalent groups having a polyether structure both ends of which are unblocked, the group (W) provides a strong dispersing effect of the microcapsules. The probable reason for this is as follows. The group (W) has a structure that tends to extend from the surface of the shell into the dispersion medium. This facilitates an increase in the distance between microcapsules within the aqueous dispersion, compared with a divalent group having a polyether structure both ends of which are unblocked. This mechanism probably causes the group (W) to provide a strong dispersing effect of the microcapsules, compared with divalent groups having a polyether structure both ends of which are unblocked.

The microcapsules according to the present disclosure have a shell having a three-dimensionally crosslinked structure including the urethane bond etc., and hence have a strong structure.

In the aqueous dispersion according to the present disclosure, such microcapsules each have a strong structure, which suppresses aggregation or coalescence of microcapsules. This probably leads to higher dispersion stability of the microcapsules.

The dispersion stability of the microcapsules is evaluated through evaluations of ejectability of the aqueous dispersion through an ink jet head, and preservation stability of the aqueous dispersion (refer to EXAMPLES described later). For example, the evaluation of ejectability enables evaluation of dispersion stability over a relatively short period from production of the aqueous dispersion; the evaluation of preservation stability enables evaluation of dispersion stability over a long period from production of the aqueous dispersion.

In contrast to the aqueous dispersion according to the present disclosure, microcapsules included in the ink described in WO2015/158748A have a shell that has an anionic group such as a carboxy group, but that does not have any nonionic group.

Therefore, the ink described in WO2015/158748A probably has lower dispersion stability of the microcapsules, compared with the aqueous dispersion according to the present disclosure.

In the aqueous dispersion according to the present disclosure, the microcapsules have a thermal-polymerizable group.

Thus, the aqueous dispersion according to the present disclosure is cured by heating or irradiation with infrared radiation, in other words, has thermal curability. Hence, when the aqueous dispersion according to the present disclosure is heated or irradiated with infrared radiation, a film having high hardness (for example, pencil hardness) is formed.

Preferred embodiments of the thermal-polymerizable group will be described later.

In contrast to the aqueous dispersion according to the present disclosure, the inks described in WO2012/073563A, JP2012-246486A, and JP1996-60063A (JP-H08-60063A) are compositions that are not curable at all. Therefore, films formed in accordance with the techniques described in these documents probably have low film hardness, compared with films formed with the aqueous dispersion according to the present disclosure.

In the aqueous dispersion according to the present disclosure, the shells have a specified nonionic group (namely, the group (W)), which provides higher hardness of the film. The probable reason for this is as follows.

A divalent group having a polyether structure both ends of which are unblocked tends to be positioned in the main chain moiety of a chain polymer. By contrast, the specified nonionic group (namely, the group (W)), which is a monovalent group having a polyether structure one end of which is blocked, tends to be positioned in the side chain moiety of the chain polymer. Thus, the group (W) is considered as a relatively mobile group, compared with the divalent group having a polyether structure both ends of which are unblocked. As a result, during curing of the film (during heating or during irradiation with infrared radiation), the group (W) has increased mobility, which promotes fusion between microcapsules. This probably results in a further increase in the hardness of the film.

As described above, the aqueous dispersion according to the present disclosure is cured by heating or irradiation with infrared radiation, in other words, has thermal curability. Thus, the aqueous dispersion according to the present disclosure enables formation of a film having high adhesion to a substrate.

Incidentally, the above-described inferences do not limit advantages of the present disclosure, but explain mere examples of the advantages.

In the aqueous dispersion according to the present disclosure, the amount of the specified nonionic group (namely, the group (W)) relative to the total solid content of the microcapsules is preferably 1 mass % to 20 mass %. When the amount of the specified nonionic group satisfies this range, the microcapsules have even higher dispersion stability.

The amount of the specified nonionic group is more preferably 5 mass % to 20 mass %.

In the aqueous dispersion according to the present disclosure, the amount of the anionic group relative to 1 g of the solid content of the microcapsules is preferably 0.2 mmol/g to 1.5 mmol/g. When the amount of the anionic group satisfies this range, the microcapsules have even higher dispersion stability.

The amount of the anionic group is more preferably 0.3 mmol/g to 1.3 mmol/g.

In the aqueous dispersion according to the present disclosure, N mass % representing the amount of the specified nonionic group (namely, the group (W)) relative to the total solid content of the microcapsules, and A mmol/g representing the amount of the anionic group relative to 1 g of the total solid content of the microcapsules preferably satisfy a ratio of A to N (A/N) of 0.02 to 0.15. When the ratio (A/N) satisfies this range, the microcapsules have even higher dispersion stability.

The ratio (A/N) is more preferably 0.02 to 0.11, still more preferably 0.03 to 0.10, particularly preferably 0.04 to 0.09.

The aqueous dispersion according to the present disclosure may be suitably used as a liquid for forming a film (such as an image) on a substrate (such as a recording medium).

Examples of the liquid include inks (such as ink-jet inks) for forming images on substrates used as recording media, and coating solutions (coating liquids) for forming coating films on substrates.

In particular, the aqueous dispersion according to the present disclosure is preferably used as an ink-jet ink. When the aqueous dispersion according to the present disclosure is used as an ink-jet ink, images having high hardness are formed. In addition, the aqueous dispersion according to the present disclosure has high dispersion stability, and hence has high ejectability through ink jet heads. In addition, the aqueous dispersion according to the present disclosure enables formation of images having high adhesion to recording media.

The ink-jet ink, which is one of applications of the aqueous dispersion according to the present disclosure, may be an ink-jet ink containing a coloring material (hereafter, also referred to as a "color ink"), or an ink-jet ink not containing coloring materials (what is called, clear ink; hereafter, also referred to as a "colorless ink").

The same applies to coating solutions, which are other applications of the aqueous dispersion according to the present disclosure.

Substrate

In the present disclosure, the substrate on which a film is formed is not particularly limited, and may be selected from publicly known substrates.

Examples of the substrate include paper, paper laminated with plastic (such as polyethylene, polypropylene, or polystyrene), metal plates (plates of metals such as aluminum, zinc, or copper), plastic films [films of, for example, polyvinyl chloride (PVC: Polyvinyl Chloride) resin, cellulose diacetate, cellulose triacetate, cellulose propionate, cellulose butyrate, cellulose acetate butyrate, cellulose nitrate, polyethylene terephthalate (PET: Polyethylene Terephthalate), polyethylene (PE: Polyethylene), polystyrene (PS: Polystyrene), polypropylene (PP: Polypropylene), polycarbonate (PC: Polycarbonate), polyvinyl acetal, or acrylic resin], paper laminated with or vapor-deposition-coated with the foregoing metals, and plastic films laminated with or vapor-deposition-coated with the foregoing metals.

The aqueous dispersion according to the present disclosure, which enables formation of films having high adhesion to substrates, is particularly suitable for applications of forming films on unabsorptive substrates.

Preferred examples of the unabsorptive substrates include plastic substrates such as polyvinyl chloride (PVC) substrates, polystyrene (PS) substrates, polycarbonate (PC) substrates, polyethylene terephthalate (PET) substrates, polyethylene (PE) substrates, polypropylene (PP) substrates, and acrylic resin substrates.

The aqueous dispersion according to the present disclosure may also be used for applications of forming images on substrates other than plastic substrates.

Examples of the substrates other than plastic substrates include textile substrates.

Examples of the raw materials of the textile substrates include natural fibers such as cotton, silk, hemp, and wool; chemical fibers such as viscose rayon and lyocell; synthetic fibers such as polyester, polyamide, and acrylic; and mixtures of at least two selected from the group consisting of natural fibers, chemical fibers, and synthetic fibers.

The textile substrates may be textile substrates described in Paragraphs 0039 to 0042 of WO2015/158592A.

Hereinafter, components of the aqueous dispersion according to the present disclosure will be described.

Microcapsule

A microcapsule contained in the aqueous dispersion according to the present disclosure includes a core and a shell that has a three-dimensionally crosslinked structure including (a) at least one selected from the group consisting of a urethane bond and a urea bond and (b) an anionic group and a specified nonionic group, wherein at least one of the shell or the core has a thermal-polymerizable group.

Such microcapsules according to the present disclosure are constituted by an outermost shell having a three-dimensionally crosslinked structure including at least one of a urethane bond or a urea bond, and a core that is a region enclosed by the shell.

The presence of the microcapsules is confirmed by applying a microcapsule aqueous dispersion onto a support, drying the dispersion to obtain a sample for observation of the form, subsequently cutting the sample, and observing the cut section with an electron microscope, for example.

The aqueous dispersion according to the present disclosure may include only one kind of the microcapsules, or may include two or more kinds of the microcapsules.

Such microcapsules are dispersoid in the dispersion of the present disclosure.

The microcapsules have, in at least one of the shell or the core, a thermal-polymerizable group.

When microcapsules have a thermal-polymerizable group, heating or irradiation with infrared radiation causes adjacent microcapsules to be bonded together to form a crosslinked structure. Thus, the aqueous dispersion according to the present disclosure enables formation of a film having a high degree of crosslinking and high hardness.

The thermal-polymerizable group included in at least one of the shell or the core is preferably, from the viewpoint of further improving film hardness, an epoxy group, an oxetanyl group, an aziridinyl group, an azetidinyl group, a ketone group, an aldehyde group, or a blocked isocyanate group, more preferably an epoxy group or a blocked isocyanate group, particularly preferably a blocked isocyanate group.

The microcapsules may contain only one kind of the thermal-polymerizable group, or may contain two or more kinds of the thermal-polymerizable group.

The fact that the microcapsules have a thermal-polymerizable group can be confirmed by, for example, Fourier transform infrared spectroscopy (FT-IR).

In the aqueous dispersion according to the present disclosure, the microcapsules may have the thermal-polymerizable group in one of the core and the shell, or in both of them.

From the viewpoint of film hardness, more preferably, the core has the thermal-polymerizable group, specifically, the core contains a thermal-polymerizable compound.

Such thermal-polymerizable compounds encompass wide-ranging compounds having a thermal-polymerizable group.

Volume-Average Particle Size of Microcapsules

From the viewpoint of the dispersion stability of the microcapsules, the microcapsules preferably have a volume-average particle size of 0.01 μm to 10.0 μm, more preferably 0.01 μm to 5 μm, still more preferably 0.05 μm to 1 μm.

In this Specification, the "volume-average particle size of microcapsules" is a value measured by a light scattering method.

The light scattering method for measuring the volume-average particle size of microcapsules is performed with, for example, LA-960 (HORIBA, Ltd.).

Microcapsule Content

The microcapsule content of the aqueous dispersion according to the present disclosure relative to the total amount of the aqueous dispersion is preferably 1 mass % to 50 mass %, more preferably 3 mass % to 40 mass %, still more preferably 5 mass % to 30 mass %.

When the microcapsule content relative to the total amount of the aqueous dispersion is 1 mass % or more, the film to be formed has higher hardness. When the microcapsule content relative to the total amount of the aqueous dispersion is 50 mass % or less, higher dispersion stability of the microcapsules is provided.

The total solid content of the microcapsules in the aqueous dispersion according to the present disclosure relative to the total solid content of the aqueous dispersion is preferably 50 mass % or more, more preferably 60 mass % or more, still more preferably 70 mass % or more, still more preferably 80 mass % or more, still more preferably 85 mass % or more.

When the total solid content of the microcapsules relative to the total solid content of the aqueous dispersion is 50 mass % or more, the film to be formed has higher hardness, and higher dispersion stability of the aqueous dispersion is provided.

Shells of Microcapsules

The shells of microcapsules (hereafter, also simply referred to as "shells") have a three-dimensionally crosslinked structure including (a) at least one selected from the group consisting of a urethane bond and a urea bond and (b) an anionic group as a hydrophilic group and a specified nonionic group as a hydrophilic group.

Three-Dimensionally Crosslinked Structure

In the present disclosure, the "three-dimensionally crosslinked structure" is a three-dimensional network structure formed by crosslinking.

Whether the shells of microcapsules have a three-dimensionally crosslinked structure is determined in the following manner. The following procedures are performed under a condition of a liquid temperature of 25° C.

When the aqueous dispersion contains no pigments, the aqueous dispersion is directly subjected to the following procedures. When the aqueous dispersion contains a pigment, the aqueous dispersion is first centrifuged to remove the pigment, and the aqueous dispersion from which the pigment has been removed is subjected to the following procedures.

A sample is obtained from the aqueous dispersion. To the obtained sample, tetrahydrofuran (THF) in an amount of 100 mass times the total solid content of the sample is added and mixed, to prepare a diluted solution. The obtained diluted solution is centrifuged at 80000 rpm (round per minute; hereafter, this is the same) for 40 minutes. After the centrifugation, visual inspection is performed as to whether or not residue is present. When residue is present, the residue is re-dispersed in water to prepare a re-dispersed dispersion, and the obtained re-dispersed dispersion is subjected to measurement of particle size distribution performed with a wet particle size distribution analyzer (LA-960, HORIBA, Ltd.) by a light scattering method.

When these procedures are performed and particle size distribution is detected, the shells of the microcapsules are regarded as having a three-dimensionally crosslinked structure.

The three-dimensionally crosslinked structure has at least one selected from the group consisting of a urethane bond and a urea bond. The three-dimensionally crosslinked structure preferably has both of a urethane bond and a urea bond.

The total amount of urethane bond and urea bond included relative to 1 g of shells having a three-dimensionally crosslinked structure (mmol/g) is preferably 1 mmol/g to 10 mmol/g, more preferably 1.5 mmol/g to 9 mmol/g, particularly preferably 2 mmol/g to 8 mmol/g.

The three-dimensionally crosslinked structures of the shells preferably include the following Structure (1).

The three-dimensionally crosslinked structures may include a plurality of the following Structures (1), and the plurality of Structures (1) may have the same structure or different structures.

Structure (1)

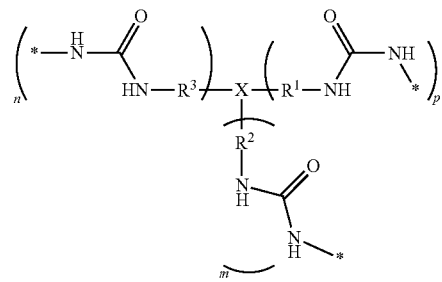

In Structure (1), X represents a (p+m+n)-valent organic group formed as a combination of at least two selected from the group consisting of a hydrocarbon group that may have a cyclic structure, —NH—, >N—, —C(=O)—, —O—, and —S—.

In Structure (1), $R^1$, $R^2$, and $R^3$ each independently represent a hydrocarbon group that has 5 to 15 carbon atoms and that may have a cyclic structure.

In Structure (1), * represents a linkage position; p, m, and n are each 0 or more, and p+m+n is 3 or more.

The total molecular weight of X, $R^1$, $R^2$, and $R^3$ is preferably less than 2000, preferably less than 1500, more preferably less than 1000. When the total molecular weight of X, $R^1$, $R^2$, and $R^3$ is less than 2000, a high enclosure ratio can be achieved for compounds for being enclosed within the cores.

In the organic group represented by X, the hydrocarbon group is preferably a linear or branched hydrocarbon group having 1 to 15 carbon atoms, more preferably a linear or branched hydrocarbon group having 1 to 10 carbon atoms.

The hydrocarbon group in the organic group represented by X and the hydrocarbon groups represented by $R^1$, $R^2$, and $R^3$ may have a cyclic structure, and examples of the cyclic structure include an alicyclic structure and an aromatic ring structure.

Examples of the alicyclic structure include a cyclohexane ring structure, a bicyclohexane ring structure, a bicyclodecane ring structure, an isobornane ring structure, a dicyclopentane ring structure, an adamantane ring structure, and a tricyclodecane ring structure.

Examples of the aromatic ring structure include a benzene ring structure, a naphthalene ring structure, and a biphenyl ring structure.

In Structure (1), p is 0 or more, preferably 1 to 10, more preferably 1 to 8, still more preferably 1 to 6, particularly preferably 1 to 3.

In Structure (1), m is 0 or more, preferably 1 to 10, more preferably 1 to 8, still more preferably 1 to 6, particularly preferably 1 to 3.

In Structure (1), n is 0 or more, preferably 1 to 10, more preferably 1 to 8, still more preferably 1 to 6, particularly preferably 1 to 3.

In Structure (1), p+m+n is preferably an integer of 3 to 10, more preferably an integer of 3 to 8, still more preferably an integer of 3 to 6.

The (p+m+n)-valent organic group represented by X is preferably a group represented by any one of the following (X-1) to (X-12).

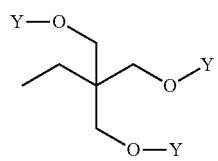
(X-1)

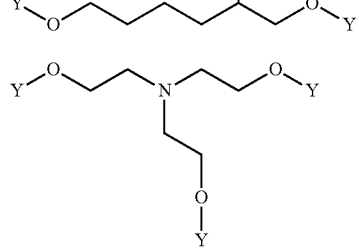
(X-2)

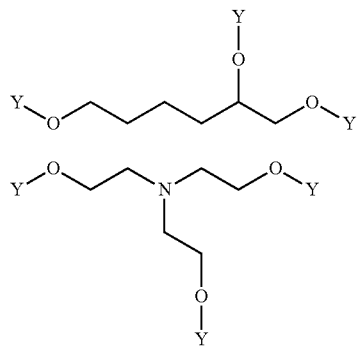
(X-3)

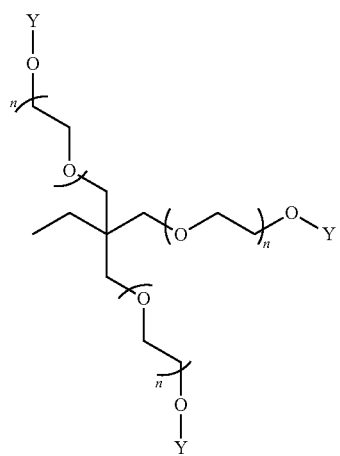
(X-4)

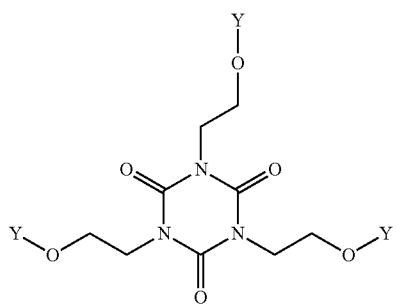
(X-5)

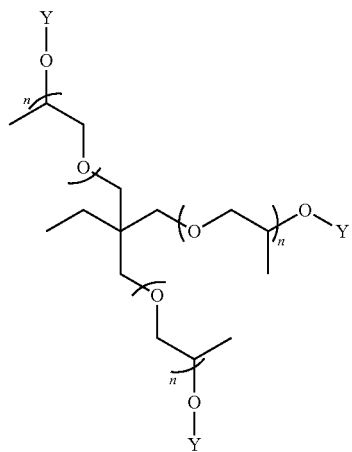
(X-6)

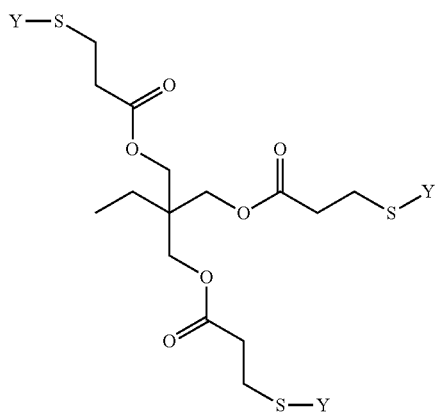
(X-7)

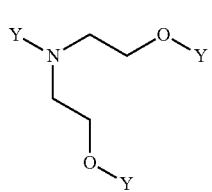
(X-8)

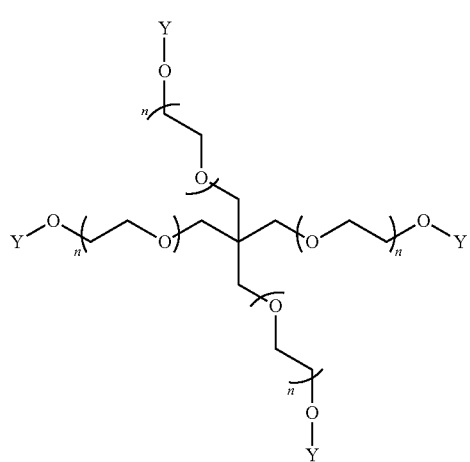
(X-9)

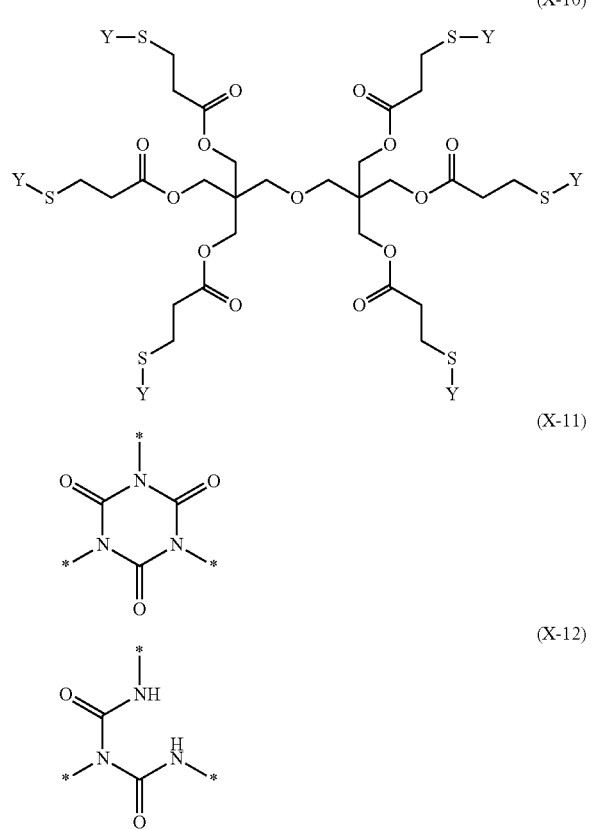
(X-10)

(X-11)

(X-12)

In Formula (X-1) to Formula (X-12), n represents an integer of 1 to 200, preferably an integer of 1 to 50, more preferably an integer of 1 to 15, particularly preferably an integer of 1 to 8.

In Formula (X-11) and Formula (X-12), * represents a linkage position.

In Formula (X-1) to Formula (X-10), Y represents the following (Y-1).

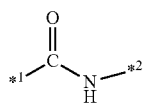
(Y-1)

In (Y-1), *$^1$ represents a linkage position for S or O in Formula (X-1) to Formula (X-10), and *$^2$ represents a linkage position for $R^1$, $R^2$, or $R^3$ in Structure (1).

In Structure (1), $R^1$, $R^2$, and $R^3$ each independently represent a hydrocarbon group that has 5 to 15 carbon atoms and that may have a cyclic structure.

The hydrocarbon groups in $R^1$, $R^2$, and $R^3$ may have a substituent, and examples of the substituent include hydrophilic groups described later that can be included in shells.

Preferably, $R^1$, $R^2$, and $R^3$ each independently represent a group represented by any one of the following (R-1) to (R-20) (hereafter, also referred to as Group (R-1) to Group (R-20)). In Group (R-1) to Group (R-20), * represents a linkage position.

(R-1)

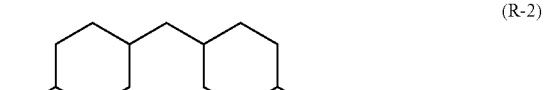
(R-2)

(R-3)

(R-4)

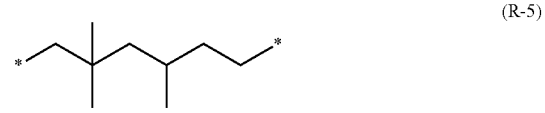
(R-5)

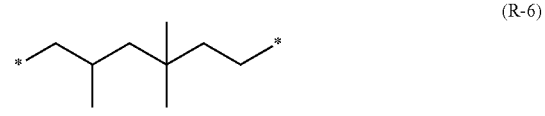
(R-6)

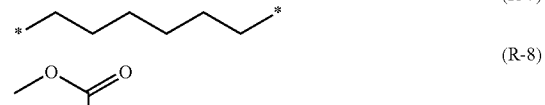
(R-7)

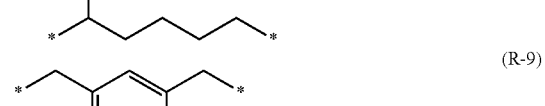
(R-8)

(R-9)

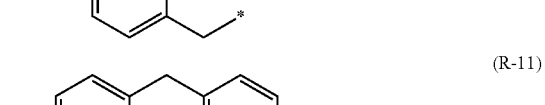
(R-10)

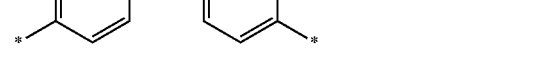
(R-11)

-continued

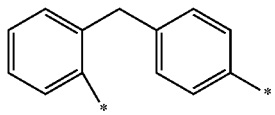 (R-12)

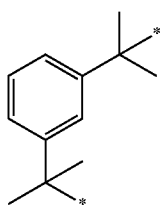 (R-13)

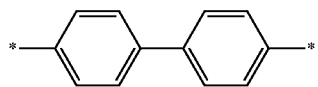 (R-14)

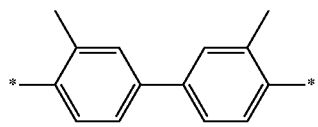 (R-15)

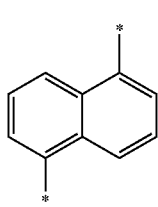 (R-16)

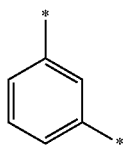 (R-17)

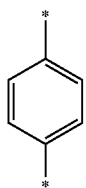 (R-18)

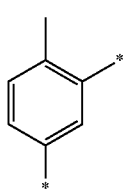 (R-19)

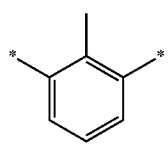 (R-20)

The content ratio of Structure (1) in the shells relative to the total mass of the shells is preferably 8 mass % to 100 mass %, more preferably 25 mass % to 100 mass %, still more preferably 50 mass % to 100 mass %.

The shells preferably include, as Structure (1), at least one structure of the following Structure (2), Structure (3), or Structure (4).

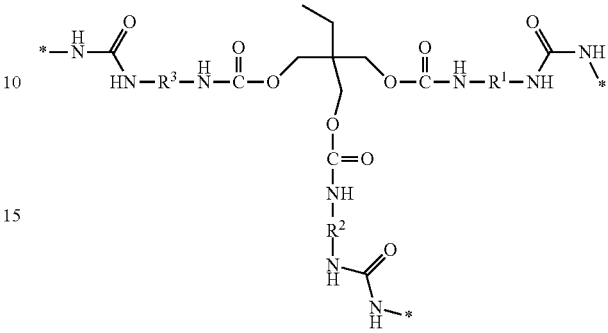

Structure (2)

In Structure (2), $R^1$, $R^2$, and $R^3$ each independently represent a hydrocarbon group that has 5 to 15 carbon atoms and that may have a cyclic structure.

In Structure (2), the hydrocarbon groups represented by $R^1$, $R^2$, and $R^3$ have the same definition and the same preferred range as in the hydrocarbon groups represented by $R^1$, $R^2$, and $R^3$ in Structure (1).

In Structure (2), * represents a linkage position.

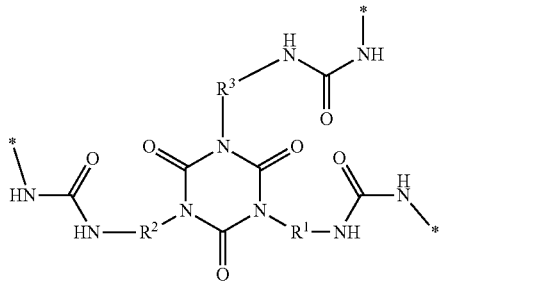

Structure (3)

In Structure (3), $R^1$, $R^2$, and $R^3$ each independently represent a hydrocarbon group that has 5 to 15 carbon atoms and that may have a cyclic structure.

In Structure (3), the hydrocarbon groups represented by $R^1$, $R^2$, and $R^3$ have the same definition and the same preferred range as in the hydrocarbon groups represented by $R^1$, $R^2$, and $R^3$ in Structure (1).

In Structure (3), * represents a linkage position.

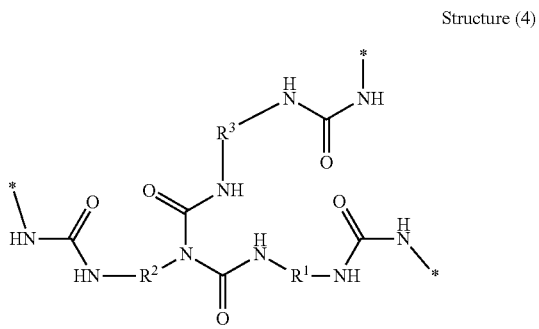

Structure (4)

In Structure (4), $R^1$, $R^2$, and $R^3$ each independently represent a hydrocarbon group that has 5 to 15 carbon atoms and that may have a cyclic structure.

In Structure (4), the hydrocarbon groups represented by $R^1$, $R^2$, and $R^3$ have the same definition and the same preferred range as in the hydrocarbon groups represented by $R^1$, $R^2$, and $R^3$ in Structure (1).

In Structure (4), * represents a linkage position.

Specific examples of Structure (1) to Structure (4) include structures described in the following Table 1.

TABLE 1

| | Structure (1) | | | | | | Corresponding |
|---|---|---|---|---|---|---|---|
| X | $R^1$ | $R^2$ | $R^3$ | p | n | m | structure |
| X-1 | R-1 | R-1 | R-1 | 1 | 1 | 1 | Structure (2) |
| X-1 | R-7 | R-7 | R-7 | 1 | 1 | 1 | Structure (2) |
| X-11 | R-1 | R-1 | R-1 | 1 | 1 | 1 | Structure (3) |
| X-11 | R-7 | R-7 | R-7 | 1 | 1 | 1 | Structure (3) |
| X-12 | R-7 | R-7 | R-7 | 1 | 1 | 1 | Structure (4) |

The three-dimensionally crosslinked structures of the shells of microcapsules can be formed by, for example, a reaction of a tri- or higher functional isocyanate compound or a bifunctional isocyanate compound, and water or a compound having two or more active hydrogen groups.

In particular, when a raw material for producing the microcapsules includes at least one compound having three or more reactive groups (isocyanate groups or active hydrogen groups), a crosslinking reaction more effectively proceeds three-dimensionally, to form a three-dimensional network structure more effectively.

The three-dimensionally crosslinked structures of the shells of the microcapsules are preferably a product formed by a reaction of water and a tri- or higher functional isocyanate compound.

Tri- or Higher Functional Isocyanate Compound

The tri- or higher functional isocyanate compound is a compound intramolecularly having three or more isocyanate groups.

Examples of the tri- or higher functional isocyanate compound include tri- or higher functional aromatic isocyanate compounds and tri- or higher functional aliphatic isocyanate compounds.

In the present disclosure, such tri- or higher functional isocyanate compounds may be publicly known compounds or compounds synthesized by methods described later.

Examples of the publicly known compounds include compounds described in "Polyurethane resin handbook" (edited by Keiji IWATA, published by THE NIKKAN KOGYO SHIMBUN, LTD. (1987)).

The tri- or higher functional isocyanate compound is preferably a compound intramolecularly having three or more isocyanate groups, specifically, a compound represented by the following Formula (X).

$$X^1 \!\!-\!\!(NCO)_n \quad \text{Formula (X)}$$

In Formula (X), $X^1$ represents an n-valent organic group.

In Formula (X), n is 3 or more; n is preferably 3 to 10, more preferably 3 to 8, still more preferably 3 to 6.

The compound represented by Formula (X) is preferably a compound represented by the following Formula (11).

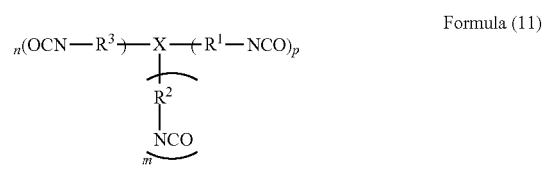

Formula (11)

In Formula (11), X, $R^1$, $R^2$, $R^3$, p, m, and n have the same definitions and the same preferred examples as in X, $R^1$, $R^2$, $R^3$, p, m, and n in Structure (1) above.

The tri- or higher functional isocyanate compound is preferably a compound derived from a bifunctional isocyanate compound (compound intramolecularly having two isocyanate groups).

More preferably, from the viewpoint of ease of formation of the three-dimensionally crosslinked structure, the tri- or higher functional isocyanate compound is an isocyanate compound derived from at least one bifunctional isocyanate compound selected from the group consisting of isophorone diisocyanate, hexamethylene diisocyanate, trimethylhexamethylene diisocyanate, 1,3-bis(isocyanatomethyl)cyclohexane, m-xylylene diisocyanate, and dicyclohexylmethane 4,4'-diisocyanate.

This term "derived" means that such a bifunctional isocyanate compound is used as the raw material, and a structure derived from the bifunctional isocyanate compound is included.

Other preferred examples of the tri- or higher functional isocyanate compound include tri- or higher functional isocyanate compounds (adduct type) provided as adducts (addition products) from a bifunctional isocyanate compound (compound intramolecularly having two isocyanate groups) and a compound intramolecularly having three or more active hydrogen groups (such as a tri- or higher functional polyol, a tri- or higher functional polyamine, or a tri- or higher functional polythiol); tri- or higher functional isocyanate compounds that are trimers of a bifunctional isocyanate compound (biuret type or isocyanurate type); and compounds intramolecularly having three or more isocyanate groups such as benzene isocyanate-formalin condensate.

Such a tri- or higher functional isocyanate compound may be a mixture including a plurality of compounds; the mixture preferably includes, as a main component, a compound represented by the following Formula (11A) or Formula (11B), and may include other components.

Adduct Type

The adduct-type tri- or higher functional isocyanate compounds are preferably compounds represented by the following Formula (11A) or Formula (11B).

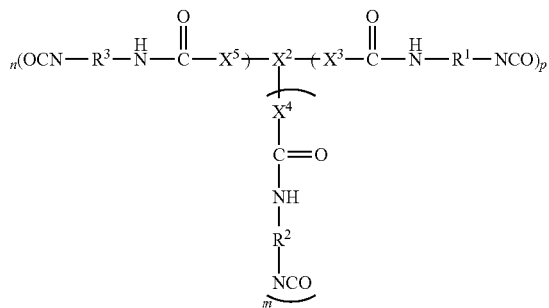

Formula (11A)

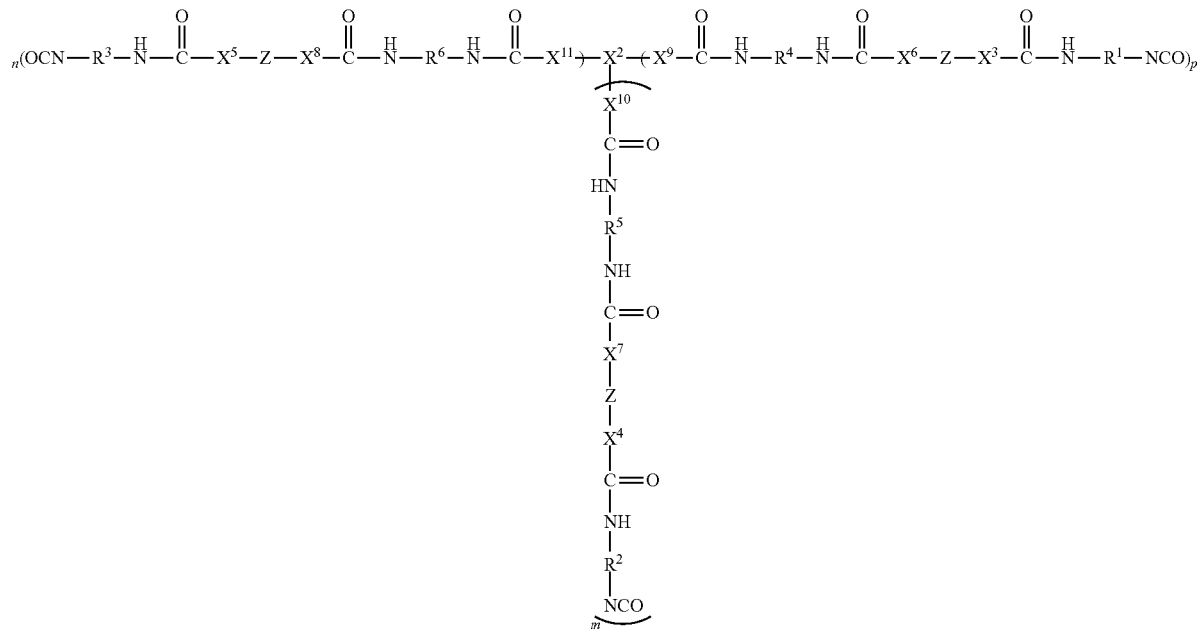

Formula (11B)

In Formula (11A) and Formula (11B), $X^2$ is a (p+m+n)-valent organic group, p, m, and n are each 0 or more, and p+m+n is 3 or more.

In Formula (11A) and Formula (11B), $X^3$ to $X^{11}$ each independently represent O, S, or NH.

In Formula (11A) and Formula (11B), $R^1$ to $R^6$ each independently represent a divalent organic group.

In Formula (11A) and Formula (11B), Z represents a divalent organic group.

In Formula (11A) and Formula (11B), $X^2$ is preferably a (p+m+n)-valent organic group that is a combination of at least two selected from the group consisting of a hydrocarbon group that may have a cyclic structure, —NH—, >N—, —C(=O)—, —O—, and —S—.

In Formula (11A) and Formula (11B), p+m+n is preferably 3 to 10, more preferably 3 to 8, still more preferably 3 to 6.

In Formula (11A) and Formula (11B), $X^3$ to $X^{11}$ each independently represent preferably O or S, more preferably O.

In Formula (11A) and Formula (11B), $R^1$ to $R^6$ each independently represent preferably a hydrocarbon group that has 5 to 15 carbon atoms and that may have a cyclic structure.

In Formula (11A) and Formula (11B), $R^1$ to $R^6$ each independently have preferred examples the same as the preferred examples of $R^1$ in Structure (1).

In Formula (11A) and Formula (11B), when $X^2$ is a hydrocarbon group that may have a cyclic structure, examples of the cyclic structure include an alicyclic structure and an aromatic ring structure.

Examples of the alicyclic structure include a cyclohexane ring structure, a bicyclohexane ring structure, a bicyclodecane ring structure, an isobornane ring structure, a dicyclopentane ring structure, an adamantane ring structure, and a tricyclodecane ring structure.

Examples of the aromatic ring structure include a benzene ring structure, a naphthalene ring structure, and a biphenyl ring structure.

In Formula (11A) and Formula (11B), when $R^1$ to $R^6$ are hydrocarbon groups that have 5 to 15 carbon atoms and that may have a cyclic structure, examples of the cyclic structure include an alicyclic structure and an aromatic ring structure.

Examples of the alicyclic structure include a cyclohexane ring structure, a bicyclohexane ring structure, a bicyclodecane ring structure, an isobornane ring structure, a dicyclopentane ring structure, an adamantane ring structure, and a tricyclodecane ring structure.

Examples of the aromatic ring structure include a benzene ring structure, a naphthalene ring structure, and a biphenyl ring structure.

In Formula (11A) and Formula (11B), the (p+m+n)-valent organic group represented by $X^2$ is preferably a group represented by any one of the following (X2-1) to (X2-10).

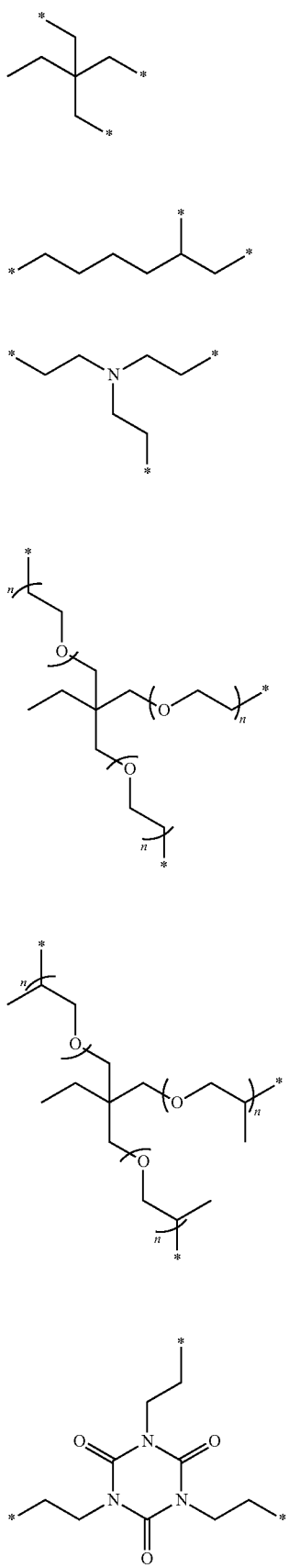
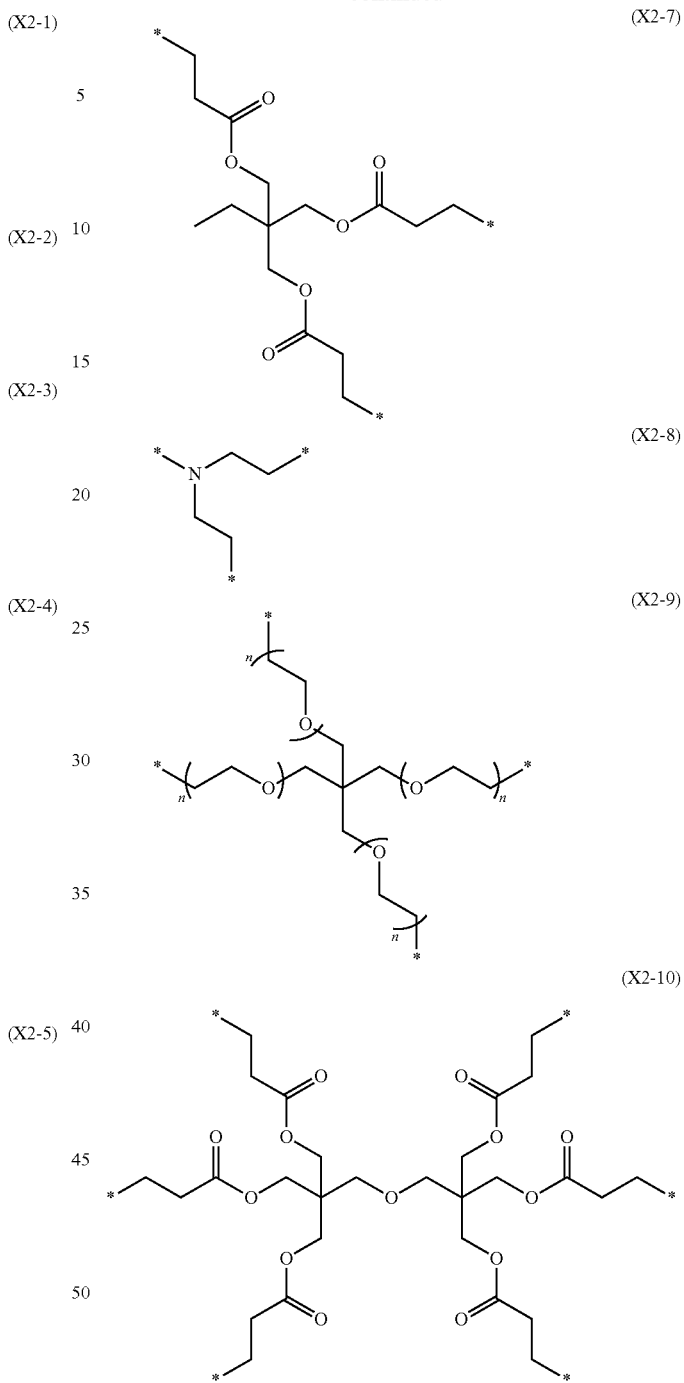

In Formula (X2-1) to Formula (X2-10), n represents an integer of 1 to 200, preferably an integer of 1 to 50, more preferably an integer of 1 to 15, particularly preferably an integer of 1 to 8.

In Formula (X2-1) to Formula (X2-10), * represents a linkage position.

In Formula (11B), the divalent organic group represented by Z is preferably a hydrocarbon group, a group having a polyoxyalkylene structure, a group having a polycaprolactone structure, a group having a polycarbonate structure, or a group having a polyester structure.

The hydrocarbon group in Z may be a linear hydrocarbon group, a branched hydrocarbon group, or a cyclic hydrocarbon group.

The hydrocarbon group in Z preferably has 2 to 30 carbon atoms.

In Formula (11A) and Formula (11B), $R^1$ to $R^6$ preferably each independently represent Group (R-1) to Group (R-20) above.

In Formula (11A) and Formula (11B), $R^1$ to $R^6$ more preferably each independently represent any one of Group (R-3) derived from isophorone diisocyanate (IPDI), Group (R-7) derived from hexamethylene diisocyanate (HDI), Group (R-5) derived from trimethylhexamethylene diisocyanate (TMHDI), Group (R-9) derived from m-xylylene diisocyanate (XDI), Group (R-1) derived from 1,3-bis(isocyanatomethyl)cyclohexane, and Group (R-2) derived from dicyclohexylmethane 4,4'-diisocyanate.

The compound represented by General Formula (11A) is preferably a compound represented by the following Formula (11A-1).

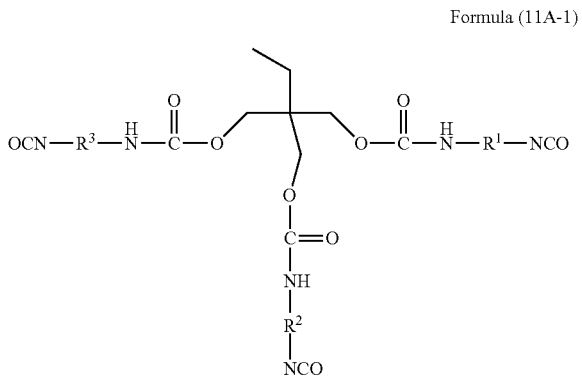

Formula (11A-1)

In Formula (11A-1), $R^1$, $R^2$, and $R^3$ have the same definitions and the same preferred examples as in $R^1$, $R^2$, and $R^3$ in Formula (11A).

The adduct-type tri- or higher functional isocyanate compound can be synthesized by a reaction between a compound intramolecularly having three or more active hydrogen groups described later and a bifunctional isocyanate compound described later.

In this Specification, the active hydrogen group means a hydroxy group, a primary amino group, a secondary amino group, or a mercapto group.

The adduct-type tri- or higher functional isocyanate compound can be obtained in the following manner: for example, a compound intramolecularly having three or more active hydrogen groups and a bifunctional isocyanate compound are, in an organic solvent, heated (at 50° C. to 100° C.) under stirring, or stirred at low temperature (0° C. to 70° C.) with addition of a catalyst such as stannous octylate.

In general, regarding the number of moles (the number of molecules) of a bifunctional isocyanate compound used to react with a compound intramolecularly having three or more active hydrogen groups, the number of moles (the number of molecules) of the bifunctional isocyanate compound is 0.6 or more times the number of moles of active hydrogen groups (the number of equivalents of active hydrogen groups) of the compound intramolecularly having three or more active hydrogen groups. The number of moles of the bifunctional isocyanate compound is preferably 0.6 times to 5 times, more preferably 0.6 times to 3 times, still more preferably 0.8 times to 2 times the number of moles of the active hydrogen groups.

Alternatively, the adduct-type tri- or higher functional isocyanate compound can be obtained by synthesizing an addition product (prepolymer) from a compound intramolecularly having two active hydrogen groups and a bifunctional isocyanate compound, and subsequently causing a reaction between this prepolymer and a compound intramolecularly having three or more active hydrogen groups.

Examples of the bifunctional isocyanate compound include a bifunctional aromatic isocyanate compound and a bifunctional aliphatic isocyanate compound.

Specific examples of the bifunctional isocyanate compound include isophorone diisocyanate (IPDI), m-phenylene diisocyanate, p-phenylene diisocyanate, 2,6-tolylene diisocyanate, 2,4-tolylene diisocyanate (TDI), naphthalene-1,4-diisocyanate, diphenylmethane-4,4'-diisocyanate (MDI), 3,3'-dimethoxy-biphenyl diisocyanate, 3,3'-dimethyldiphenylmethane-4,4'-diisocyanate, m-xylylene diisocyanate (XDI), p-xylylene diisocyanate, 4-chloroxylylene-1,3-diisocyanate, 2-methylxylylene-1,3-diisocyanate, 4,4'-diphenylpropane diisocyanate, 4,4'-diphenylhexafluoropropane diisocyanate, trimethylene diisocyanate, hexamethylene diisocyanate (HDI), propylene-1,2-diisocyanate, butylene-1,2-diisocyanate, cyclohexylene-1,2-diisocyanate, cyclohexylene-1,3-diisocyanate, cyclohexylene-1,4-diisocyanate, dicyclohexylmethane-4,4'-diisocyanate, 1,4-bis(isocyanatomethyl)cyclohexane, 1,3-bis(isocyanatomethyl)cyclohexane (HXDI), norbornene diisocyanate (NBDI), trimethylhexamethylene diisocyanate (TMHDI), lysine diisocyanate, and 1,3-bis(2-isocyanato-2-propyl)benzene.

Preferred bifunctional isocyanate compounds are compounds having structures represented by the following (I-1) to (I-24).

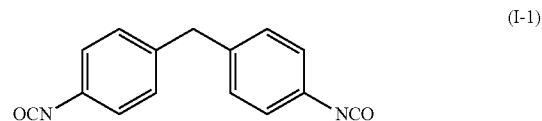

(I-1) MDI

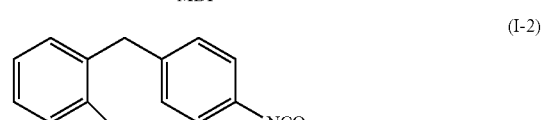

(I-2)

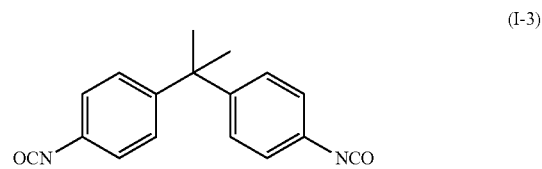

(I-3)

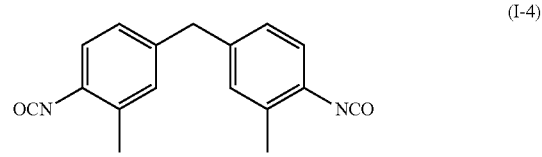

(I-4)

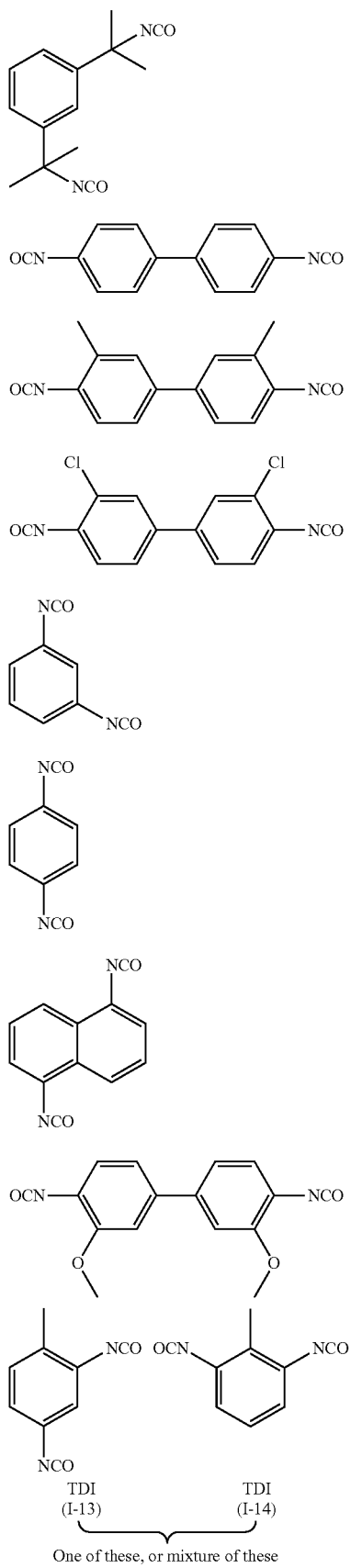
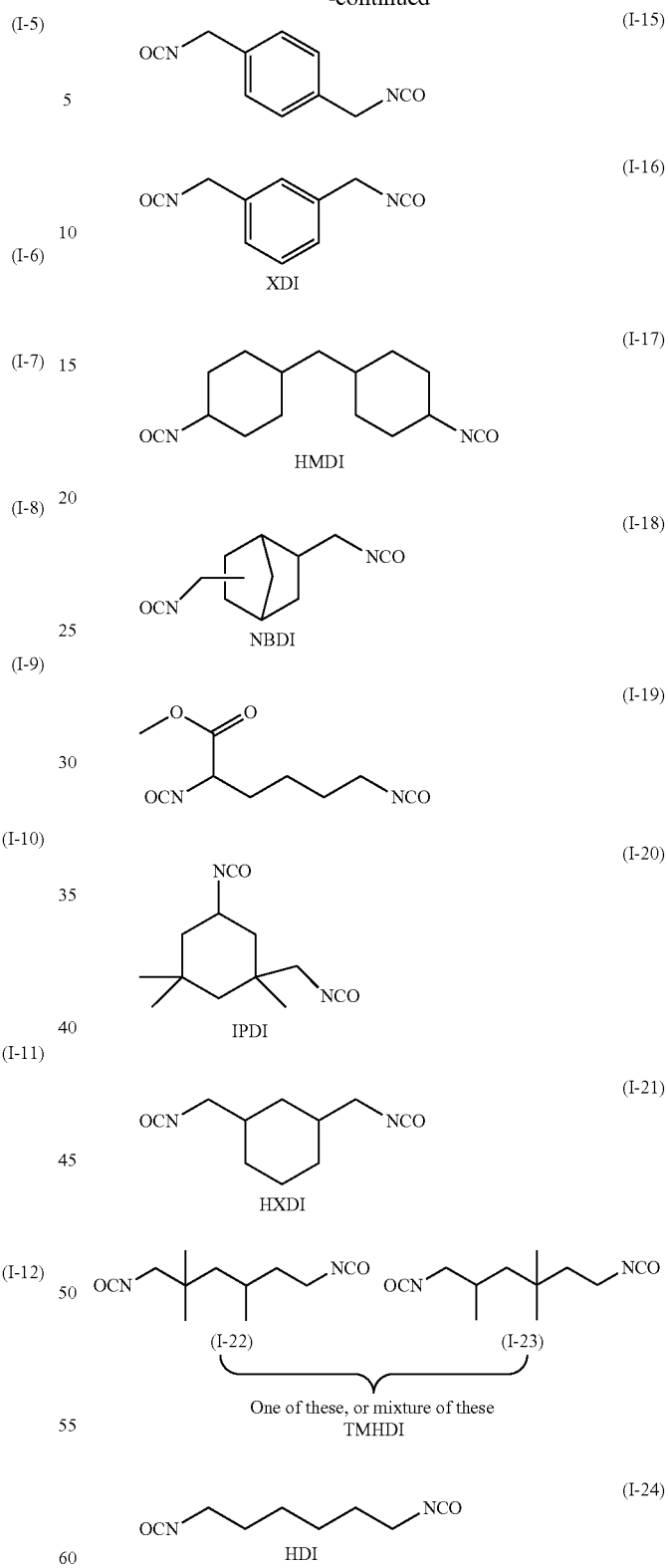
Of these, the bifunctional isocyanate compound is particularly preferably at least one compound selected from the group consisting of isophorone diisocyanate (IPDI), hexamethylene diisocyanate (HDI), trimethylhexamethylene diisocyanate (TMHDI), 1,3-bis(isocyanatomethyl)cyclohexane (HXDI), m-xylylene diisocyanate (XDI), and dicyclohexyl-methane-4,4'-diisocyanate (HMDI).

The bifunctional isocyanate compound may be bifunctional isocyanate compounds derived from the above-described compounds. Examples include DURANATE (registered trademark) D101, D201, and A101 (all from Asahi Kasei Corporation).

The compound intramolecularly having three or more active hydrogen groups is a compound intramolecularly having three or more groups of at least one selected from the group consisting of a hydroxy group, a primary amino group, a secondary amino group, and a mercapto group; examples include compounds having structures represented by the following (H-1) to (H-13). Incidentally, in the following structures, n represents an integer selected from the group consisting of 1 to 100.

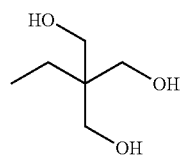
(H-1)

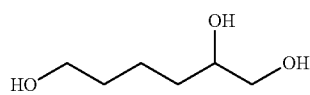
(H-2)

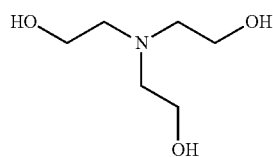
(H-3)

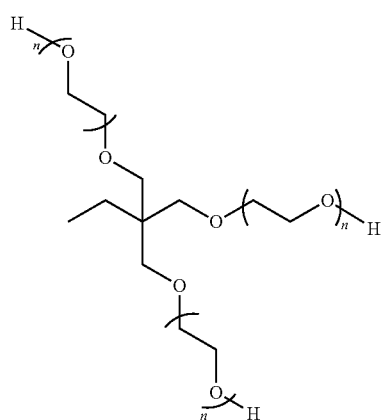
(H-4)

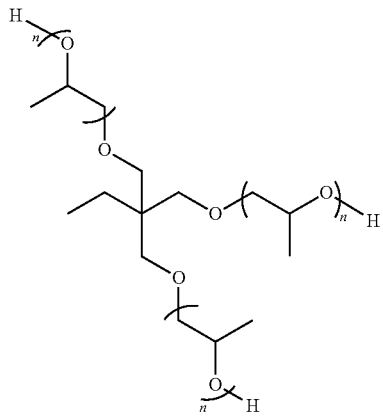
(H-5)

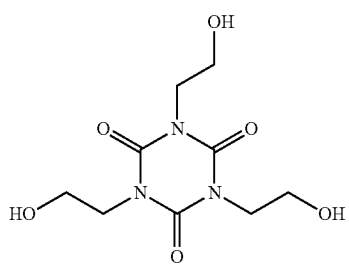
(H-6)

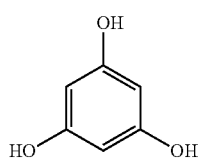
(H-7)

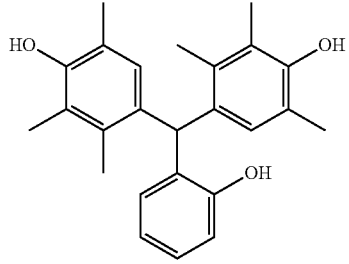
(H-8)

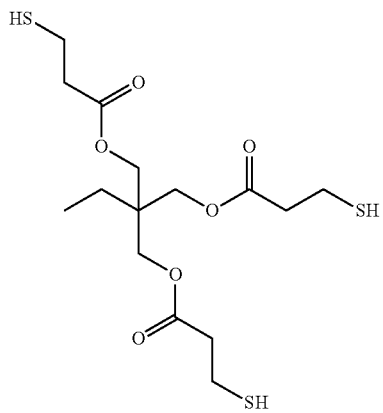
(H-9)

(H-10) 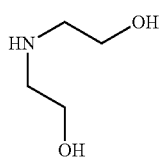

(H-11) 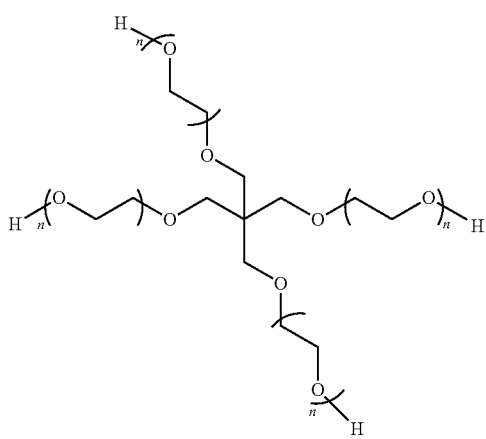

(H-12) 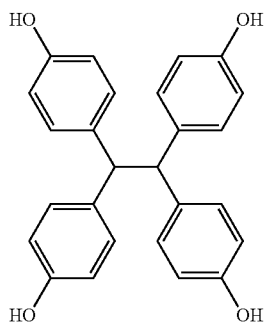

(H-13) 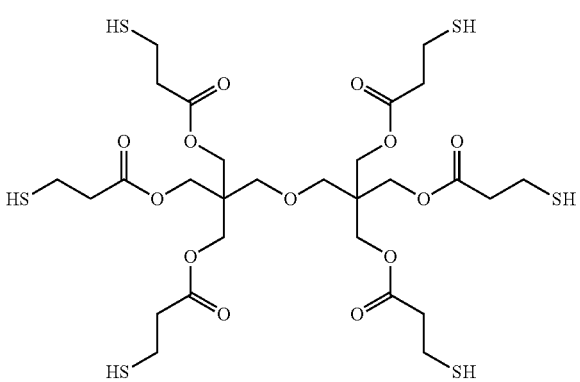

The adduct-type tri- or higher functional isocyanate compound is preferably a compound obtained by, in accordance with a combination described in the following Table 2, a reaction between a compound intramolecularly having two or more active hydrogen groups and a bifunctional isocyanate compound.

TABLE 2

| Compound No. | Polyisocyanate structure | | Composition | |
|---|---|---|---|---|
| | Compound having two or more active hydrogen groups | Bifunctional isocyanate compound | Compound having two or more active hydrogen groups (mol equivalent) | Bifunctional isocyanate compound (mol equivalent) |
| NCO 101 | trimethylolpropane | 2,4-tolylene diisocyanate (TDI) | 1 | 4 |
| NCO 102 | | m-xylylene diisocyanate (XDI) | 1 | 4 |
| NCO 103 | | hexamethylene diisocyanate (HDI) | 1 | 4 |
| NCO 104 | | 1,3-bis(isocyanatomethyl)cyclohexane (HXDI) | 1 | 4 |
| NCO 105 | | isophorone diisocyanate (IPDI) | 1 | 4 |
| NCO 106 | 1,3,5-trihydroxybenzene | hexamethylene diisocyanate (HDI) | 1 | 4 |
| NCO 107 | | isophorone diisocyanate (IPDI) | 1 | 4 |

TABLE 2-continued

| Compound No. | Polyisocyanate structure — Compound having two or more active hydrogen groups | Bifunctional isocyanate compound | Composition — Compound having two or more active hydrogen groups (mol equivalent) | Bifunctional isocyanate compound (mol equivalent) |
|---|---|---|---|---|
| NCO 108 | pentaerythritol ethylene oxide | 1,3-bis(isocyanatomethyl)cyclohexane (HXDI) | 1 | 5 |
| NCO 109 | pentaerythritol ethylene oxide | isophorone diisocyanate (IPDI) | 1 | 5 |
| NCO 110 | dipentaerythritol hexakis(3-mercaptopropionate) | hexamethylene diisocyanate (HDI) | 1 | 7 |
| NCO 111 | dipentaerythritol hexakis(3-mercaptopropionate) | isophorone diisocyanate (IPDI) | 1 | 7 |
| NCO 112 | triethanolamine | hexamethylene diisocyanate (HDI) | 1 | 4 |
| NCO 113 | triethanolamine | isophorone diisocyanate (IPDI) | 1 | 4 |

Of the compounds in Table 2 above, the adduct-type tri- or higher functional isocyanate compound is more preferably NCO 102 to NCO 105, NCO 107, NCO 108, NCO 111, and NCO 113.

The adduct-type tri- or higher functional isocyanate compound may be a commercially available product on the market.

Examples of the commercially available product include TAKENATE (registered trademark) D-102, D-103, D-103H, D-103M2, P49-75S, D-110N, D-120N, D-140N, D-160N (all from Mitsui Chemicals, Inc.), DESMODUR (registered trademark) L75, UL57SP (Sumika Bayer Urethane Co., Ltd.), CORONATE (registered trademark) HL, HX, L (Nippon Polyurethane Industry Co., Ltd.), and P301-75E (Asahi Kasei Corporation).

In particular, the adduct-type tri- or higher functional isocyanate compound is more preferably at least one selected from the group consisting of TAKENATE (registered trademark) D-110N, D-120N, D-140N, and D-160N from Mitsui Chemicals, Inc.

Biuret Type or Isocyanurate Type

The isocyanurate-type tri- or higher functional isocyanate compound is preferably a compound represented by the following Formula (11C).

The biuret-type tri- or higher functional isocyanate compound is preferably a compound represented by the following Formula (11D).

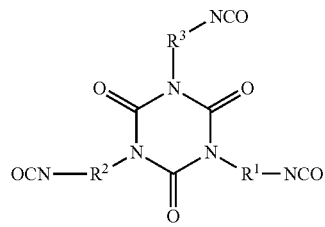

Formula (11C)

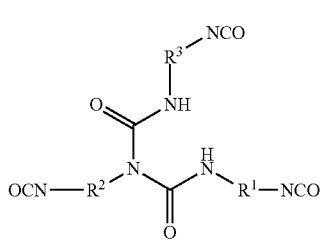

Formula (11D)

In Formula (11C) and Formula (11D), $R^1$, $R^2$, and $R^3$ each independently represent a divalent organic group.

In Formula (11C) and Formula (11D), preferably, $R^1$, $R^2$, and $R^3$ each independently represent an alkylene group that may have a substituent having 1 to 20 carbon atoms, a cycloalkylene group that may have a substituent having 1 to 20 carbon atoms, or an arylene group that may have a substituent having 1 to 20 carbon atoms.

In Formula (11C) and Formula (11D), particularly preferably, $R^1$, $R^2$, and $R^3$ each independently represent a group selected from the group consisting of the above-described groups represented by (R-1) to (R-20).

In Formula (11C) and Formula (11D), $R^1$ to $R^3$ more preferably each independently represent any one of Group (R-3) derived from isophorone diisocyanate (IPDI), Group (R-7) derived from hexamethylene diisocyanate (HDI), Group (R-5) derived from trimethylhexamethylene diisocyanate (TMHDI), Group (R-9) derived from m-xylylene diisocyanate (XDI), Group (R-1) derived from 1,3-bis(isocyanatomethyl)cyclohexane, and Group (R-2) derived from dicyclohexylmethane 4,4'-diisocyanate.

The isocyanurate-type tri- or higher functional isocyanate compound may be a commercially available product on the market.

Examples of the commercially available product include TAKENATE (registered trademark) D-127N, D-170N, D-170HN, D-172N, D-177N (all from Mitsui Chemicals, Inc.), SUMIDUR N3300, DESMODUR (registered trademark) N3600, N3900, Z4470BA (all from Sumika Bayer Urethane Co., Ltd.), CORONATE (registered trademark) HX, HK (all from Nippon Polyurethane Industry Co., Ltd.), DURANATE (registered trademark) TPA-100, TKA-100, TSA-100, TSS-100, TLA-100, and TSE-100 (all from Asahi Kasei Corporation).

Of these, more preferred examples of the isocyanurate-type tri- or higher functional isocyanate compound include at least one selected from the group consisting of TAKENATE (registered trademark) D-127N from Mitsui Chemicals, Inc., and DURANATE (registered trademark) TKA-100, TSS-100, and TSE-100 from Asahi Kasei Corporation.

The biuret-type tri- or higher functional isocyanate compound may be a commercially available product on the market.

Examples of the commercially available product include TAKENATE (registered trademark) D-165N, NP1100 (all from Mitsui Chemicals, Inc.), DESMODUR (registered trademark) N3200 (Sumika Bayer Urethane Co., Ltd.), and DURANATE (registered trademark) 24A-100 (Asahi Kasei Corporation).

Of these, more preferred examples of the biuret-type tri- or higher functional isocyanate compound include DURANATE (registered trademark) 24A-100 (Asahi Kasei Corporation).

Of the biuret-type or isocyanurate-type tri- or higher functional isocyanate compounds, more preferred are DURANATE (registered trademark) 24A-100 (manufactured by Asahi Kasei Corporation), D-120N, D-127 (manufactured by Mitsui Chemicals, Inc.), TKA-100, TSS-100, and TSE-100 (manufactured by Asahi Kasei Corporation).

The isocyanate-group content relative to 1 g of the tri- or higher functional isocyanate compound (unit: mmol/g) is preferably 1 mmol/g to 10 mmol/g, more preferably 1.5 mmol/g to 8 mmol/g, still more preferably 2 mmol/g to 6 mmol/g.

The isocyanate-group content can be calculated in the following manner: a target isocyanate compound is dissolved in dehydrated toluene, subsequently caused to react with an excess of a di-n-butylamine solution added; the remaining di-n-butylamine is subjected to back titration with hydrochloric acid; and, from the titer at the inflection point on the titration curve, the isocyanate-group content can be calculated.

More specifically, the calculation is performed by the following method.

Neutralization titration is performed with a potentiometric titrator (AT-510, manufactured by Kyoto Electronics Manufacturing Co., Ltd.) at 25° C. with a 1 mol/L aqueous solution of hydrochloric acid in accordance with the following methods of blank measurement and sample measurement. From the obtained titers Z1 and Z2, the isocyanate-group content can be calculated with the following Formula (N).

Isocyanate-group content (mmol/g)=(Z1−Z2)/(W×Y)   Formula (N)

In Formula (N), Z1 represents the titer of a blank, Z2 represents the titer of a sample, W represents the solid content of the sample, and Y represents the mass of the sample.

Blank Measurement

To a 100 mL beaker, 10 mL of dehydrated toluene, 10.0 mL of a 2 mol/L di-n-butylamine solution, and 50 mL of isopropyl alcohol are added and mixed to prepare a mixed solution. This mixed solution is subjected to neutralization titration with a 1 mol/L hydrochloric acid solution. The end point is taken as the inflection point on the titration curve, and titer Z1 (mL) to the end point is determined.

Sample Measurement

A sample having a solid content of W mass % (isocyanate compound, Y g) is sampled to a 100 mL beaker. To this beaker, 20 (mL) of dehydrated toluene is added to dissolve the sample, to prepare a solution. To this solution, 10.0 mL of a 2 mol/L di-n-butylamine solution is added, and the solution is mixed and subsequently left to stand for 20 or more minutes. To the solution having been left to stand, 50 mL of isopropyl alcohol is added. Subsequently, neutralization titration is performed with a 1 mol/L hydrochloric acid solution. The end point is taken as the inflection point on the titration curve, and titer Z2 (mL) to the end point is determined.

Water or Compound Having Two or More Active Hydrogen Groups

The shells of the microcapsules can be formed by a reaction between the above-described tri- or higher functional isocyanate compound and water or a compound having two or more active hydrogen groups.

The compound generally used to react with the tri- or higher functional isocyanate compound is water. The reaction between the tri- or higher functional isocyanate compound and water results in formation of a three-dimensionally crosslinked structure having a urea bond.

Alternatively, another compound (other than water) that may be used to react with the tri- or higher functional isocyanate compound is a compound having two or more active hydrogen groups.

Examples of such an active hydrogen group include a hydroxy group, amino groups (primary amino groups and secondary amino groups), and a mercapto group (namely, a thiol group).

Examples of the compound having two or more active hydrogen groups include polyfunctional alcohols, polyfunctional phenols, polyfunctional amines having hydrogen atoms on nitrogen atoms, and polyfunctional thiols.

A reaction between the tri- or higher functional isocyanate compound and a polyfunctional alcohol or a polyfunctional phenol results in formation of a three-dimensionally crosslinked structure having a urethane bond.

A reaction between the tri- or higher functional isocyanate compound and a polyfunctional amine having hydrogen atoms on nitrogen atoms results in formation of a three-dimensionally crosslinked structure having a urea bond.

Specific examples of the polyfunctional alcohols include propylene glycol, glycerol, trimethylolpropane, and 4,4',4"-trihydroxytriphenylmethane.

Specific examples of the polyfunctional amines include diethylenetriamine, and tetraethylenepentamine.

Specific examples of the polyfunctional thiols include 1,3-propanedithiol and 1,2-ethanedithiol.

Specific examples of the polyfunctional phenols include bisphenol A.

Such compounds having two or more active hydrogen groups may be used alone or in combination of two or more thereof.

Incidentally, the compound having two or more active hydrogen groups also includes the above-described compound intramolecularly having three or more active hydrogen groups.

Specified Nonionic Group as Hydrophilic Group

The three-dimensionally crosslinked structures of the shells have, as the specified nonionic group that is a hydrophilic group, the following group (W). As described above, this provides higher dispersion stability of the aqueous dispersion and higher curability of the film. The three-dimensionally crosslinked structures of the shells may have only one kind of the group (W), or may have two or more kinds of the group (W).

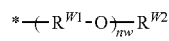

Formula (W)

In Formula (W), $R^{W1}$ represents an alkylene group that has 1 to 6 carbon atoms and that may be branched, $R^{W2}$ represents an alkyl group that has 1 to 6 carbon atoms and that may be branched, nw represents an integer of 2 to 200, and * represents a linkage position.

In Formula (W), in $R^{W1}$, the number of carbon atoms of the alkylene group that has 1 to 6 carbon atoms and that may be branched is preferably 2 to 4, more preferably 2 or 3, particularly preferably 2 (specifically, $R^{W1}$ is an ethylene group).

In Formula (W), in $R^{W2}$, the number of carbon atoms of the alkyl group that has 1 to 6 carbon atoms and that may be branched is preferably 1 to 4, particularly preferably 1 (specifically, $R^{W2}$ is a methyl group).

In Formula (W), nw represents an integer of 2 to 200; however, nw is preferably an integer of 10 to 200, preferably an integer of 10 to 150, more preferably an integer of 20 to 150, particularly preferably an integer of 20 to 100.

The shells may have, in addition to the specified nonionic group, a nonionic group other than specified nonionic groups (such as a divalent group having a polyether structure both ends of which are unblocked).

From the viewpoint of more effectively providing advantages of the aqueous dispersion according to the present disclosure, in the shells, the content ratio of the specified nonionic group to all the nonionic groups is preferably 50 mass % to 100 mass %, more preferably 70 mass % to 100 mass %, particularly preferably 80 mass % to 100 mass %.

The specified nonionic group (namely, the group (W)) can be introduced into the shells by a reaction of the above-described tri- or higher functional isocyanate compound, at least one of a compound having the specified nonionic group and an active hydrogen group or a specified-nonionic-group-introduced isocyanate compound, and water or a compound having two or more active hydrogen groups.

The specified-nonionic-group-introduced isocyanate compound can be produced by, for example, a reaction of a bi- or higher functional isocyanate compound and a compound having the specified nonionic group and an active hydrogen group.

Compound Having Specified Nonionic Group and Active Hydrogen Group

The compound having the specified nonionic group and an active hydrogen group may have only a single specified nonionic group, or two or more specified nonionic groups.

The compound having the specified nonionic group and an active hydrogen group may have only a single active hydrogen group, or two or more active hydrogen groups.

The compound having the specified nonionic group and an active hydrogen group is preferably at least one compound selected from the group consisting of monoethers of polyethylene oxide (such as monomethyl ether and monoethyl ether) and monoesters of polyethylene oxide (such as monoacetate and mono(meth)acrylate).

Specified-Nonionic-Group-Introduced Isocyanate Compound

As described above, the specified nonionic group can be introduced into the shells also by using a specified-nonionic-group-introduced isocyanate compound.

The specified nonionic group introduced into the isocyanate compound may be only a single group or two or more groups.

The specified-nonionic-group-introduced isocyanate compound is preferably a reaction product prepared from a compound having the specified nonionic group and an active hydrogen group, a compound having two or more active hydrogen groups, and a bifunctional isocyanate compound (particularly preferably, isophorone diisocyanate (IPDI), hexamethylene diisocyanate (HDI), trimethylhexamethylene diisocyanate (TMHDI), 1,3-bis(isocyanatomethyl)cyclohexane (HXDI), m-xylylene diisocyanate (XDI), or dicyclohexylmethane-4,4'-diisocyanate (HMDI)); or a reaction product of a compound having the specified nonionic group and an active hydrogen group and a bifunctional isocyanate compound.

When the specified nonionic group is introduced into the shells, the specified-nonionic-group-introduced isocyanate compound is preferably an addition product prepared from a compound having two or more active hydrogen groups, a bifunctional isocyanate compound, and a compound having the specified nonionic group and an active hydrogen group.

Preferred examples of the compound having two or more active hydrogen groups and the bifunctional isocyanate compound are described above.

The compound having the specified nonionic group (namely, the group (W)) and an active hydrogen group is preferably a compound represented by the following Formula (WM).

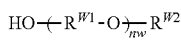

Formula (WM)

In Formula (WM), $R^{W1}$, $R^{W2}$, and nw have the same definitions and the same preferred examples as in the above-described $R^{W1}$, $R^{W2}$, and nw in Formula (W).

The addition product prepared from a compound having two or more active hydrogen groups, a bifunctional isocyanate compound, and a compound having the specified nonionic group and an active hydrogen group is preferably an addition product prepared from trimethylolpropane (TMP), m-xylylene diisocyanate (XDI), and polyethylene glycol monomethyl ether (EO) (for example, TAKENATE (registered trademark) D-116N from Mitsui Chemicals, Inc.).

When a hydrophilic group is introduced into the shells by using a compound having the specified nonionic group and an active hydrogen group, the amount of the compound having the specified nonionic group and an active hydrogen group used relative to the total solid content of the microcapsules is preferably 0.1 mass % to 50 mass %, more preferably 0.1 mass % to 45 mass %, still more preferably 0.1 mass % to 40 mass %, still more preferably 1 mass % to 35 mass %, still more preferably 3 mass % to 30 mass %.

In the specified-nonionic-group-introduced isocyanate compound, the average functional-group number of isocyanate groups may be 3 or less. However, even in this case, as long as the raw materials for forming the shells include at least one tri- or higher functional isocyanate compound, the shells having a three-dimensionally crosslinked structure can be formed.

Anionic Group as Hydrophilic Group

The three-dimensionally crosslinked structures of the shells have at least one anionic group as a hydrophilic group.

From the viewpoint of providing microcapsules having higher dispersion stability, the anionic group is preferably at least one selected from the group consisting of a carboxy group, a salt of a carboxy group, a sulfo group, a salt of a sulfo group, a phosphoric acid group, a salt of a phosphoric acid group, a phosphonic acid group, a salt of a phosphonic acid group, a sulfuric acid group, and a salt of a sulfuric acid group.

Such "salts" are preferably alkali metal salts or organic amine salts, more preferably alkali metal salts, particularly preferably sodium salts or potassium salts.

Of these, the anionic group is preferably, from the viewpoint of the dispersion stability of microcapsules, at least one selected from the group consisting of a carboxy group, a salt of a carboxy group, a sulfo group, a salt of a sulfo group, a phosphoric acid group, and a salt of a phosphoric acid group, more preferably at least one selected from the group consisting of a carboxy group and a salt of a carboxy group.

From the viewpoint of ease of introduction of an anionic group into the shells (three-dimensionally crosslinked structures), the three-dimensionally crosslinked structures of the shells preferably include, as a structure including an anionic group, at least one of structures represented by the following Formulas (X1) to (X4) (hereafter, also referred to as Structures (X1) to (X4)).

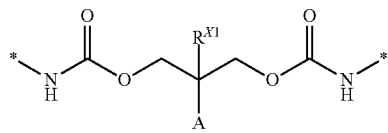

Formula (X1)

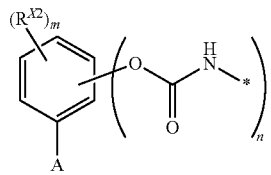

Formula (X2)

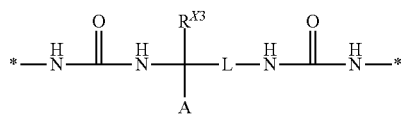

Formula (X3)

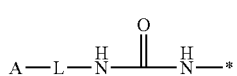

Formula (X4)

In Formula (X1), $R^{X1}$ represents a hydrogen atom or an alkyl group having 1 to 10 carbon atoms, A represents an anionic group, and * represents a linkage position.

In Formula (X2), $R^{X2}$ represents an alkyl group having 1 to 10 carbon atoms, A represents an anionic group, n represents an integer of 1 to 5, m represents an integer of 0 to 4, m and n are in total an integer of 1 to 5, and * represents a linkage position.

In Formula (X3), $R^{X3}$ represents a hydrogen atom or an alkyl group having 1 to 10 carbon atoms, A represents an anionic group, L represents a divalent linking group, and * represents a linkage position.

In Formula (X4), A represents an anionic group, L represents a divalent linking group, and * represents a linkage position.

In Formula (X1), $R^{X1}$ represents a hydrogen atom or an alkyl group having 1 to 10 carbon atoms.

In $R^{X1}$, the alkyl group having 1 to 10 carbon atoms may be a linear alkyl group, a branched alkyl group, or an alkyl group having an alicyclic structure (such as a cycloalkyl group).

In $R^{X1}$, examples of the alkyl group having 1 to 10 carbon atoms include a methyl group, an ethyl group, a propyl group, a butyl group, and a cyclohexyl group.

In $R^{X1}$, the alkyl group having 1 to 10 carbon atoms preferably has 1 to 6 carbon atoms.

In particular, $R^{X1}$ is preferably a hydrogen atom or an alkyl group having 1 to 6 carbon atoms.

In Formula (X1), the anionic group represented by A is preferably at least one selected from the group consisting of a carboxy group, a salt of a carboxy group, a sulfo group, a salt of a sulfo group, a phosphoric acid group, a salt of a phosphoric acid group, a phosphonic acid group, a salt of a phosphonic acid group, a sulfuric acid group, and a salt of a sulfuric acid group; more preferably at least one selected from the group consisting of a carboxy group, a salt of a carboxy group, a sulfo group, a salt of a sulfo group, a phosphoric acid group, and a salt of a phosphoric acid group;

particularly preferably at least one selected from the group consisting of a carboxy group and a salt of a carboxy group.

In the preferred examples of the anionic group represented by A, such "salts" are preferably alkali metal salts or organic amine salts, more preferably alkali metal salts, particularly preferably sodium salts or potassium salts.

In Formula (X2), $R^{X2}$ represents an alkyl group having 1 to 10 carbon atoms.

The alkyl group having 1 to 10 carbon atoms represented by $R^{X2}$ has the same definition and has the same preferred examples as in the alkyl group having 1 to 10 carbon atoms in $R^{X1}$ in Formula (X1).

The preferred examples of the anionic group represented by A in Formula (X2) are the same as the preferred examples of the anionic group represented by A in Formula (X1).

In Formula (X2), n preferably represents an integer of 1 to 3, particularly preferably 2.

In Formula (X2), m represents an integer of 0 to 2, particularly preferably 0.

In Formula (X3), $R^{X3}$ represents a hydrogen atom or an alkyl group having 1 to 10 carbon atoms.

In Formula (X3), in $R^{X3}$, the alkyl group having 1 to 10 carbon atoms has the same definition and has the same preferred examples as in the alkyl group having 1 to 10 carbon atoms in $R^{X1}$ in Formula (X1).

In Formula (X3), $R^{X3}$ preferably represents a hydrogen atom or an alkyl group having 1 to 6 carbon atoms, particularly preferably a hydrogen atom.

Preferred examples of the anionic group represented by A in Formula (X3) are the same as the preferred examples of the anionic group represented by A in Formula (X1).

In Formula (X3), the divalent linking group represented by L is preferably an alkylene group having 1 to 10 carbon atoms, an aromatic group having 5 to 10 carbon atoms, or a divalent group that is a combination of two or more groups selected from the group consisting of the alkylene group and the aromatic group.

In Formula (X3), the alkylene group having 1 to 10 carbon atoms in L may be a linear alkylene group, a branched alkylene group, or an alkylene group having an alicyclic structure (such as a cycloalkylene group).

Examples of the alkylene group having 1 to 10 carbon atoms in L include a methylene group, an ethylene group, a propylene group, a butylene group, and a cyclohexylene group.

Examples of the aromatic group having 5 to 10 carbon atoms in L include a phenylene group.

The divalent linking group in L is more preferably an alkylene group having 1 to 10 carbon atoms, still more preferably an alkylene group having 1 to 6 carbon atoms.

A and L in Formula (X4) respectively have the same definition and have the same preferred examples as in A and L in Formula (X3).

Structure (X1) and Structure (X2) can be formed with, for example, an anionic-group-introduced isocyanate compound.

Structure (X3) and Structure (X4) can be formed with, for example, a compound having an anionic group and an amino group as an active hydrogen group (such as amino acid).

More specifically, Structure (X3) can be formed with lysine, for example. Structure (X4) can be formed with, for example, β-alanine, taurine, or ethanolamine phosphate (EAP).

The three-dimensionally crosslinked structures of the shells preferably include, as the structure including an anionic group, at least Structure (X3) or Structure (X4), more preferably include at least Structure (X3). Stated another way, the anionic group is preferably introduced with Structure (X3) or Structure (X4) into the shells, preferably introduced with Structure (X3) into the shells.

A urea bond is less hydrolyzable than a urethane bond. Thus, an anionic group introduced with the urea bond of Structure (X3) or Structure (X4) (more preferably, Structure (X3)) into the shells is more strongly bonded to the three-dimensionally crosslinked structures of the shells than an anionic group introduced with the urethane bond of Structure (X1) or Structure (X2) into the shells. For this reason, an aqueous dispersion containing microcapsules having an anionic group contributing to dispersibility and being introduced via a urea bond into the shells, and having Structure (X3) or Structure (X4) (more preferably Structure (X3)), has higher dispersion stability of the microcapsules, in particular, higher long-term dispersion stability (namely, preservation stability).

The anionic group can be introduced into the shells by a reaction of the above-described tri- or higher functional isocyanate compound, at least one of a compound having an anionic group and an active hydrogen group or an anionic-group-introduced isocyanate compound, and water or a compound having two or more active hydrogen groups.

The anionic-group-introduced isocyanate compound can be produced by, for example, a reaction of a bi- or higher functional isocyanate compound, and a compound having an anionic group and an active hydrogen group.

Compound Having Anionic Group and Active Hydrogen Group

The compound having an anionic group and an active hydrogen group may have only a single anionic group, or two or more anionic groups.

The compound having an anionic group and an active hydrogen group may have only a single active hydrogen group, or two or more active hydrogen groups.

Examples of the compound having an anionic group and an active hydrogen group include amino acids such as α-amino acids (specifically lysine, alanine, arginine, asparagine, aspartic acid, cysteine, glutamine, glutamic acid, glycine, histidine, isoleucine, leucine, methionine, phenylalanine, proline, serine, threonine, tryptophan, tyrosine, and valine) and β-amino acids (such as β-alanine), malic acid, taurine, and ethanolamine phosphate (EAP).

Other specific examples of the compound having an anionic group and an active hydrogen group are as follows.

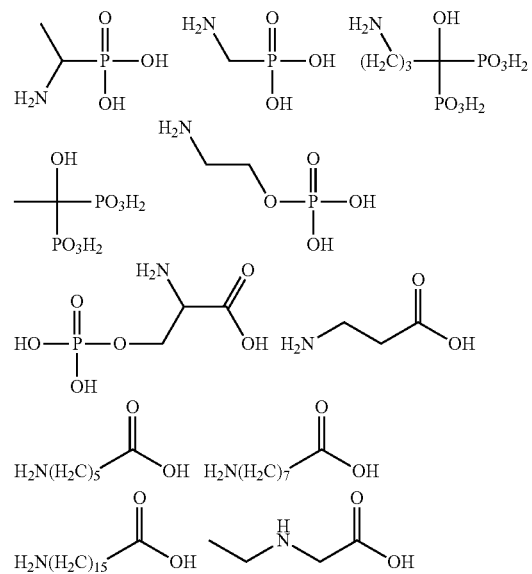

Anionic-Group-Introduced Isocyanate Compound

As described above, the introduction of an anionic group into the shells may be performed with an anionic-group-introduced isocyanate compound. The number of introduced anionic groups in the isocyanate compound may be only one, or two or more.

The anionic-group-introduced isocyanate compound is preferably a reaction product of a compound having an anionic group and an active hydrogen group, a compound having two or more active hydrogen groups, and a bifunctional isocyanate compound (particularly preferably, isophorone diisocyanate (IPDI), hexamethylene diisocyanate (HDI), trimethylhexamethylene diisocyanate (TMHDI), 1,3-bis(isocyanatomethyl)cyclohexane (HXDI), m-xylylene diisocyanate (XDI), or dicyclohexylmethane-4,4'-diisocyanate (HMDI)); or a reaction product of a compound having an anionic group and an active hydrogen group, and a bifunctional isocyanate compound.

When introduction of an anionic group into the shells is performed with the compound having an anionic group and an active hydrogen group, the amount of compound having an anionic group and an active hydrogen group used relative to the total solid content of the microcapsules is preferably 0.1 mass % to 50 mass %, more preferably 0.1 mass % to 45 mass %, still more preferably 0.1 mass % to 40 mass %, still more preferably 1 mass % to 30 mass %, still more preferably 3 mass % to 20 mass %.

In the anionic-group-introduced isocyanate compound, the average functional-group number of isocyanate groups may be 3 or less. However, even in this case, as long as the raw materials for forming the shells include at least one tri- or higher functional isocyanate compound, the shells having a three-dimensionally crosslinked structure can be formed.

Thermal-Polymerizable Group that can be Included in Shells

As described above, the microcapsules have a thermal-polymerizable group in at least one of the core or the shell.

The microcapsules have a thermal-polymerizable group, and hence adjacent microcapsules can be bonded together to form a crosslinked structure. This enables formation of a film having a high degree of crosslinking and high hardness.

The microcapsules may have such a thermal-polymerizable group in a form in which a thermal-polymerizable group is introduced into the three-dimensionally crosslinked structures of the shells, or may have such a polymerizable group in a form in which the cores include a thermal-polymerizable compound (in other words, a compound having a thermal-polymerizable group). Alternatively, the microcapsules may have a thermal-polymerizable group in both of these forms.

Hereinafter, a method for introducing a thermal-polymerizable group into the three-dimensionally crosslinked structures of the shells will be described.

The thermal-polymerizable compound that can be included in the cores will be described later.

Examples of the method for introducing a thermal-polymerizable group into the three-dimensionally crosslinked structures of the shells include:

during formation of three-dimensionally crosslinked structures of the shells, a method of causing a reaction among the above-described tri- or higher functional isocyanate compound, water or the above-described compound having two or more active hydrogen groups, and a monomer for introducing a thermal-polymerizable group;

during production of the above-described tri- or higher functional isocyanate compound, a method of causing a reaction between the above-described bi- or higher functional isocyanate compound and a monomer for introducing a thermal-polymerizable group, to produce a thermal-polymerizable-group-introduced isocyanate compound, and subsequently causing a reaction between the thermal-polymerizable-group-introduced isocyanate compound, and water or the above-described compound having two or more active hydrogen groups; and during production of the microcapsules, a method of dissolving, in an oil-phase component, the constituent components of the microcapsules, and a monomer for introducing a thermal-polymerizable group, adding an aqueous-phase component to the oil-phase component, performing mixing, and performing emulsification.

The monomer for introducing a thermal-polymerizable group may be a compound having at least one active hydrogen group, and having, in at least one of the terminals, a thermal-polymerizable group.

The compound having at least one active hydrogen group, and having, in at least one of the terminals, a thermal-polymerizable group, can be represented by the following Formula (ma).

$$L^1Lc_mZ_n \qquad (ma)$$

In Formula (ma), $L^1$ represents an m+n-valent linking group; m and n each independently represent an integer selected from the group consisting of 1 to 100; Lc represents a monovalent thermal-polymerizable group; and Z represents an active hydrogen group.

$L^1$ preferably represents a bi- or higher valent aliphatic group, a bi- or higher valent aromatic group, a bi- or higher valent heterocyclic group, —O—, —S—, —NH—, —N<, —CO—, —SO—, —SO$_2$—, or a combination of the foregoing.

Preferably, m and n each independently represent 1 to 50, more preferably 2 to 20, still more preferably 3 to 10, particularly preferably 3 to 5.

The monovalent thermal-polymerizable group represented by Lc is preferably an epoxy group, an oxetanyl group, an aziridinyl group, an azetidinyl group, a ketone group, an aldehyde group, or a blocked isocyanate group, more preferably an epoxy group or a blocked isocyanate group, particularly preferably a blocked isocyanate group.

Z is preferably OH, SH, NH, or NH$_2$, more preferably OH or NH$_2$, still more preferably OH.

The monomer for introducing a thermal-polymerizable group may be a single compound alone, or may be a combination of two or more compounds.

During production of the thermal-polymerizable-group-introduced isocyanate compound, a reaction is preferably caused between polyisocyanate (in other words, a tri- or higher functional isocyanate compound) and a monomer for introducing a thermal-polymerizable group (in other words, a compound having at least one active hydrogen group and having, in at least one of the terminals, a thermal-polymerizable group) at a ratio in which the number of moles of the active hydrogen group of the monomer for introducing a thermal-polymerizable group is 0.01 times to 0.3 times (more preferably 0.02 times to 0.25 times, still more preferably 0.03 times to 0.2 times) the number of moles of the isocyanate groups of the polyisocyanate.

In the thermal-polymerizable-group-introduced isocyanate compound, the average functional-group number of isocyanate groups may be 3 or less. However, even in this case, as long as the raw materials for forming the shells include at least one tri- or higher functional isocyanate compound, the shells having a three-dimensionally cross-linked structure can be formed.

Cores of Microcapsules

The components of the cores of the microcapsules are not particularly limited. However, the cores preferably include at least one thermal-polymerizable compound.

In addition to this, the cores may include other components (described later) of the aqueous dispersion.

Thermal-Polymerizable Compound

The cores of the microcapsules preferably include a thermal-polymerizable compound.

An embodiment in which the cores of the microcapsules include a thermal-polymerizable compound enables further enhancement of film curing sensitivity and film hardness.

When the cores of the microcapsules include a thermal-polymerizable compound, the cores may include a single thermal-polymerizable compound alone, or may include two or more thermal-polymerizable compounds.

When the cores of the microcapsules include a thermal-polymerizable compound, the thermal-polymerizable group of the thermal-polymerizable compound functions as the thermal-polymerizable group of the cores.

In the embodiment in which the cores of the microcapsules include a thermal-polymerizable compound, not only the cores but also the shells may have a thermal-polymerizable group.

The thermal-polymerizable compound that can be included in the cores of the microcapsules may be a thermal-polymerizable monomer, a thermal-polymerizable oligomer, or a thermal-polymerizable polymer; from the viewpoint of enhancing film curing sensitivity and film hardness, preferred is a thermal-polymerizable monomer.

From the viewpoint of enhancing film curing sensitivity and film hardness, the content of the thermal-polymerizable compound that can be included in the cores of the microcapsules (preferably a thermal-polymerizable monomer. Hereafter, this is the same.) (in the case of including two or more compounds, the content is the total content thereof) relative to the total solid content of the microcapsules is preferably 10 mass % to 70 mass %, more preferably 20 mass % to 60 mass %, still more preferably 30 mass % to 55 mass %.

The thermal-polymerizable compound preferably has a molecular weight that is a weight-average molecular weight of 100 to 100000, more preferably 100 to 30000, still more preferably 100 to 10000, still more preferably 100 to 4000, still more preferably 100 to 2000, still more preferably 100 to 1000, still more preferably 100 to 900, still more preferably 100 to 800, particularly preferably 150 to 750.

Incidentally, the weight-average molecular weight of the thermal-polymerizable compound is a value measured by gel permeation chromatography (GPC).

In this Specification, measurement by gel permeation chromatography (GPC) can be performed with a measurement device of an HLC (registered trademark)-8020GPC (Tosoh Corporation), three columns of TSKgel (registered trademark) Super Multipore HZ-H (4.6 mm ID×15 cm, Tosoh Corporation), and an eluent that is THF (tetrahydrofuran). The measurement conditions are a sample concentration of 0.45 mass %, a flow rate of 0.35 ml/min, a sample injection amount of 10 μl, a measurement temperature of 40° C., and use of a differential refractive index (RI) detector.

The calibration curve is created with "Standard samples TSK standard, polystyrene" from Tosoh Corporation: 8 samples of "F-40", "F-20", "F-4", "F-1", "A-5000", "A-2500", "A-1000", and "n-propylbenzene".

Thermal-Polymerizable Monomer

The thermal-polymerizable monomer can be selected from the group consisting of thermal-polymerizable monomers that can be polymerized by being heated or irradiated with infrared radiation. Examples of the thermal-polymerizable monomer include epoxy compounds, oxetane compounds, aziridine compounds, azetidine compounds, ketone compounds, aldehyde compounds, and blocked isocyanate compounds. Of these, from the viewpoint of providing higher film hardness, blocked isocyanate compounds are particularly preferred.

Of these, examples of the epoxy compounds include bi- or lower functional epoxy compounds such as 1,4-butanediol diglycidyl ether, 3-(bis(glycidyloxymethyl)methoxy)-1,2-propanediol, limonene oxide, 2-biphenyl glycidyl ether, 3,4-epoxycyclohexylmethyl-3',4'-epoxycyclohexanecarboxylate, epichlorohydrin-bisphenol S-derived epoxide, epoxidated styrene, epichlorohydrin-bisphenol F-derived epoxide, epichlorohydrin-bisphenol A-derived epoxide, epoxidated novolac, and alicyclic diepoxide; and tri- or higher functional epoxy compounds such as polyglycidyl ester of polybasic acid, polyglycidyl ether of polyol, polyglycidyl ether of polyoxyalkylene glycol, polyglycidyl ester of aromatic polyol, urethane polyepoxy compounds, and polyepoxy polybutadiene.

Examples of the oxetane compounds include 3-ethyl-3-hydroxymethyl-1-oxetane, 1,4bis[3-ethyl-3-oxetanyl-methoxy)methyl]benzene, 3-ethyl-3-phenoxymethyl-oxetane, bis([1-ethyl(3-oxetanyl)]methyl) ether, 3-ethyl-3-[(2-ethylhexyloxy)methyl]oxetane, 3-ethyl-[(triethoxysilylpropoxy)methyl]oxetane, and 3,3-dimethyl-2-(p-methoxyphenyl)-oxetane.

Examples of the blocked isocyanate compounds include compounds obtained by deactivating isocyanate compounds with a blocking agent (active-hydrogen-containing compound).

Preferred examples of such an isocyanate compound include commercially available isocyanates such as hexamethylene diisocyanate, isophorone diisocyanate, toluyl diisocyanate, xylylene diisocyanate, hexamethylene diisocyanate trimer, trimethylhexylylene diisocyanate, diphenylmethane diisocyanate, dicyclohexylmethane diisocyanate, hydrogenated xylylene diisocyanate, TAKENATE (registered trademark; Mitsui Chemicals, Inc.), DURANATE (registered trademark; Asahi Kasei Corporation), and BAYHYDUR (registered trademark; Bayer AG); and bi- or higher functional isocyanates that are combinations of the foregoing.

Examples of the blocking agent include lactam [such as ε-caprolactam, δ-valerolactam, and γ-butyrolactam], oxime [such as acetoxime, methyl ethyl ketoxime (MEK oxime), methyl isobutyl ketoxime (MIBK oxime), and cyclohexanone oxime], amine [such as aliphatic amine (such as dimethylamine, diisopropylamine, di-n-propylamine, and diisobutylamine), alicyclic amine (such as methylhexylamine, and dicyclohexylamine), and aromatic amine (such as aniline, and diphenylamine)], aliphatic alcohol [such as methanol, ethanol, 2-propanol, and n-butanol], phenol and alkylphenol [such as phenol, cresol, ethylphenol, n-propylphenol, isopropylphenol, n-butylphenol, octylphenol, nonylphenol, xylenol, diisopropylphenol, and di-t-butylphenol], imidazole [such as imidazole, and 2-methylimidazole], pyrazole [such as pyrazole, 3-methylpyrazole, and 3,5-dimethylpyrazole], imine [such as ethyleneimine, and polyethyleneimine], active methylene [such as dimethyl malonate, diethyl malonate, diisopropyl malonate, acetylacetone, methyl acetoacetate, and ethyl acetoacetate], blocking agents described in JP2002-309217A and JP2008-239890A, and mixtures of two or more of the foregoing. In particular, preferred blocking agents are oxime, lactam, pyrazole, active methylene, and amine.

The blocked isocyanate compound may be a commercially available product on the market. Preferred examples include TRIXENE (registered trademark) BI7982, BI7641, BI7642, BI7950, BI7960, and BI7991 (Baxenden Chemicals LTD), and BAYHYDUR (registered trademark; Bayer AG). There are also other preferred examples that are a compound group described in Paragraph [0064] in WO2015/158654A.

The thermal-polymerizable monomer can be included in the cores of the microcapsules in the following manner: during production of the microcapsules, the constituent components of the microcapsules and the thermal-polymerizable monomer are dissolved to form an oil-phase component; to the oil-phase component, an aqueous-phase component is added; mixing is performed; and emulsification is performed.

The thermal-polymerizable monomer preferably has a molecular weight that is a weight-average molecular weight of 100 to 4000, more preferably 100 to 2000, still more preferably 100 to 1000, still more preferably 100 to 900, still more preferably 100 to 800, particularly preferably 150 to 750.

Incidentally, the weight-average molecular weight of the thermal-polymerizable monomer is a value measured by gel permeation chromatography (GPC). The measurement method is described above.

Thermal-Polymerizable Oligomer and Thermal-Polymerizable Polymer

An embodiment in which the thermal-polymerizable compound is a thermal-polymerizable oligomer or a thermal-polymerizable polymer is advantageous in that shrinkage of the film during curing is reduced, and degradation of adhesion between the film and the substrate is suppressed.

When, as the thermal-polymerizable compound, a thermal-polymerizable oligomer or a thermal-polymerizable polymer is included, preferred is an embodiment in which a photothermal conversion agent, a thermal curing accelerator, or a photothermal conversion agent and a thermal curing accelerator described later are included.

Examples of the thermal-polymerizable oligomer or the thermal-polymerizable polymer include epoxy resins.

The thermal-polymerizable group of the thermal-polymerizable oligomer or the thermal-polymerizable polymer is particularly preferably an epoxy group.

When the cores of microcapsules include, as the thermal-polymerizable compound, a thermal-polymerizable oligomer or a thermal-polymerizable polymer, the thermal-polymerizable oligomer or the thermal-polymerizable polymer may have a single thermal-polymerizable-group alone, or two or more thermal-polymerizable-groups.

Such a thermal-polymerizable group can be introduced into a polymer or an oligomer by a polymer reaction or copolymerization.

The thermal-polymerizable oligomer and the thermal-polymerizable polymer may be commercially available products on the market.

Examples of commercially available products of the thermal-polymerizable oligomer and the thermal-polymerizable polymer include epoxy resins such as EBECRYL (registered trademark) 3708 (DAICEL-ALLNEX LTD.), CN120, CN120B60, CN120B80, CN120E50 (all from Sartomer), HITALOID 7851 (Hitachi Chemical Company, Ltd.), and EPICLON (registered trademark) 840 (DIC Corporation).

Enclosure Ratio of Thermal-Polymerizable Compound

When the cores of the microcapsules include a thermal-polymerizable compound, from the viewpoint of film curing sensitivity, the enclosure ratio (mass %) of the thermal-polymerizable compound is preferably 10 mass % or more, more preferably 50 mass % or more, still more preferably 70 mass % or more, still more preferably 80 mass % or more, still more preferably 90 mass % or more, still more preferably 95 mass % or more, still more preferably 97 mass % or more, particularly preferably 99 mass % or more.

When the aqueous dispersion includes two or more thermal-polymerizable compounds, at least one of the thermal-polymerizable compounds preferably has an enclosure ratio satisfying such a preferred range.

The enclosure ratio (mass %) of such a thermal-polymerizable compound means, in the case of preparing the aqueous dispersion, the amount of thermal-polymerizable compound included in the cores of microcapsules relative to the total amount of thermal-polymerizable compound in the aqueous dispersion. This enclosure ratio is a value determined in the following manner.

Method of Measuring Enclosure Ratio (Mass %) of Thermal-Polymerizable Compound

The following procedures are performed under a condition of a liquid temperature of 25° C.

When the aqueous dispersion contains no pigments, the aqueous dispersion is directly subjected to the following procedures. When the aqueous dispersion contains a pigment, the aqueous dispersion is first centrifuged to remove the pigment, and the aqueous dispersion from which the pigment has been removed is subjected to the following procedures.

From the aqueous dispersion, two samples of the same mass (hereafter, referred to as "Sample 1" and "Sample 2") are first obtained.

To Sample 1, tetrahydrofuran (THF) in an amount of 100 mass times the total solid content of Sample 1 is added, and mixing is performed to prepare a diluted solution. The obtained diluted solution is centrifuged at 80000 rpm for 40 minutes. A supernatant liquid generated by the centrifugation (hereafter, referred to as "Supernatant liquid 1") is collected.

As a result of this procedure, the entirety of the thermal-polymerizable compound included in Sample 1 is probably extracted to Supernatant liquid 1. The mass of the thermal-polymerizable compound included in the collected Supernatant liquid 1 is measured by liquid chromatography (for example, with a liquid chromatography apparatus from Waters Corporation). The determined mass of the thermal-polymerizable compound is defined as the "total amount of thermal-polymerizable compound".

Sample 2 is centrifuged under the same conditions as in the centrifugation performed for the diluted solution. A supernatant liquid generated by the centrifugation (hereafter, referred to as "Supernatant liquid 2") is collected. As a result of this procedure, the thermal-polymerizable compound not enclosed within microcapsules (in other words, in a free state) in Sample 2 is probably extracted to Supernatant liquid 2. The mass of the thermal-polymerizable compound included in the collected Supernatant liquid 2 is determined by liquid chromatography (for example, a liquid chromatography apparatus from Waters Corporation). The determined mass of the thermal-polymerizable compound is defined as the "amount of free thermal-polymerizable compound".

From the "total amount of thermal-polymerizable compound" and the "amount of free thermal-polymerizable compound", the enclosure ratio (mass %) of the thermal-polymerizable compound is calculated using the following formula.

Enclosure ratio (mass %) of thermal-polymerizable compound=((total amount of thermal-polymerizable compound−amount of free thermal-polymerizable compound)/total amount of thermal-polymerizable compound)×100

When the aqueous dispersion includes two or more thermal-polymerizable compounds, the enclosure ratio of the entirety of the two or more thermal-polymerizable compounds may be calculated from the total amount of the two or more thermal-polymerizable compounds being determined as the "total amount of thermal-polymerizable compound", and the total amount of two or more free thermal-polymerizable compounds being determined as the "amount of free thermal-polymerizable compound"; alternatively, the enclosure ratio of any one of the thermal-polymerizable compounds may be calculated from the amount of any one of the thermal-polymerizable compounds being determined as the "total amount of thermal-polymerizable compound", and the amount of any one of free thermal-polymerizable compounds being determined as the "amount of free thermal-polymerizable compound".

Incidentally, whether or not the cores of microcapsules include components other than thermal-polymerizable compounds can also be determined by the same method as the method of determining whether or not the cores of microcapsules include a thermal-polymerizable compound.

However, regarding a compound having a molecular weight of 1000 or more, the masses of the compound included in the above-described Supernatant liquid 1 and Supernatant liquid 2 are measured by gel permeation chromatography (GPC) as the "total amount of compound" and the "amount of free compound", and the enclosure ratio (mass %) of the compound is determined. The measurement conditions of GPC are the same as those described above.

Photothermal Conversion Agent

When the cores of microcapsules include a thermal-polymerizable compound (preferably, a thermal-polymerizable monomer), the cores may include at least one photothermal conversion agent.

The photothermal conversion agent is a compound that absorbs light such as infrared radiation (namely, an active energy ray) to generate heat, to polymerize and cure a thermal-polymerizable compound. The photothermal conversion agent may be a publicly known compound.

The photothermal conversion agent is preferably an infrared absorbent. Examples of the infrared absorbent include polymethylindolium, indocyanine green, polymethine pigment, croconium pigment, cyanine pigment, merocyanine pigment, squarylium pigment, chalcogenopyryloallylidene pigment, metal thiolate complex pigment, bis(chalcogenopyrylo)polymethine pigment, oxyindolizine pigment, bisaminoallylpolymethine pigment, indolizine pigment, pyrylium pigment, quinoid pigment, quinone pigment, phthalocyanine pigment, naphthalocyanine pigment, azo pigment, azomethine pigment, and carbon black.

The photothermal conversion agent can be included in the cores of microcapsules in the following manner: during production of microcapsules, the constituent components of microcapsules and the photothermal conversion agent are dissolved to form an oil phase; to the oil phase, an aqueous phase is added; mixing is performed; and the resultant mixture is emulsified.

Such photothermal conversion agents may be used alone or in combination of two or more thereof.

The photothermal conversion agent content relative to the total solid content of microcapsules is preferably 0.1 mass % to 25 mass %, more preferably 0.5 mass % to 20 mass %, still more preferably 1 mass % to 15 mass %.

The enclosure ratio (mass %) of the photothermal conversion agent and the method of measuring the enclosure ratio conform to the enclosure ratio of the thermal-polymerizable compound and the method of measuring the enclosure ratio.

Thermal Curing Accelerator

When the cores of microcapsules include a thermal-polymerizable compound (preferably a thermal-polymerizable monomer), the cores may include at least one thermal curing accelerator.

The thermal curing accelerator is a compound that catalytically promotes the thermosetting reaction of the thermal-polymerizable compound (preferably a thermal-polymerizable monomer).

The thermal curing accelerator may be a publicly known compound. The thermal curing accelerator is preferably acid or base, or a compound that generates acid or base under heating. Examples include carboxylic acid, sulfonic acid, phosphoric acid, aliphatic alcohol, phenol, aliphatic amine, aromatic amine, imidazole (such as 2-methylimidazole), and pyrazole.

The thermal curing accelerator can be included in the cores of microcapsules in the following manner: during production of microcapsules, components for forming microcapsules and the thermal curing accelerator are mixed and dissolved to form an oil phase; to the oil phase, an aqueous phase is added; mixing is performed; and the resultant mixture is emulsified.

Such thermal curing accelerators may be used alone or in combination of two or more thereof.

The thermal curing accelerator content relative to the total solid content of microcapsules is preferably 0.1 mass % to 25 mass %, more preferably 0.5 mass % to 20 mass %, still more preferably 1 mass % to 15 mass %.

The enclosure ratio (mass %) of the thermal curing accelerator and the method of measuring the enclosure ratio conform to the enclosure ratio of the thermal-polymerizable compound and the method of measuring the enclosure ratio.

Resin

The cores of the microcapsules may include at least one resin.

This "resin" is a resin other than the above-described thermal-polymerizable oligomer and thermal-polymerizable polymer, in other words, a resin not having any thermal-polymerizable group.

When the cores of the microcapsules contain resin, the microcapsules have higher strength, so that films can be formed to have higher strength, for example.

The resin that can be included in the cores of the microcapsules is not particularly limited. Examples of the resin include publicly known resins such as polyacrylate resins, polystyrene resins, polyurethane resins, polycarbonate resins, and polyester resins.

The resin that can be included in the cores of the microcapsules preferably has a weight-average molecular weight of 5000 to 500000, more preferably 10000 to 200000, still more preferably 10000 to 100000, particularly preferably 10000 to 50000.

The content of resin that can be included in the cores of the microcapsules (in the case of including two or more resins, the content is the total content thereof) relative to the total solid content of the microcapsules is preferably 1 mass % to 50 mass %, more preferably 5 mass % to 40 mass %, still more preferably 10 mass % to 40 mass %.

The enclosure ratio (mass %) of the resin and the method of measuring the enclosure ratio conform to the enclosure ratio of the thermal-polymerizable compound and the method of measuring the enclosure ratio.

Water

The aqueous dispersion according to the present disclosure includes water as the dispersion medium for microcapsules.

The water content of the aqueous dispersion is not particularly limited; for example, the water content relative to the total amount of the aqueous dispersion is preferably 10 mass % to 99 mass %, more preferably 20 mass % to 95 mass %, still more preferably 30 mass % to 90 mass %, particularly preferably 50 mass % to 90 mass %.

Coloring Material

The aqueous dispersion according to the present disclosure may include at least one coloring material.

When the aqueous dispersion according to the present disclosure includes a coloring material, the coloring material is preferably included outside of the microcapsules.

The coloring material is not particularly limited, and can be freely selected from publicly known coloring materials such as pigments, water-soluble dyes, and disperse dyes. Of these, pigments are more preferred as the coloring materials because of high weather resistance and high color reproducibility.

The pigments are not particularly limited, and may be appropriately selected in accordance with the purpose. Examples of the pigments include publicly known organic pigments and inorganic pigments. Other examples of the pigments include commercially available pigment dispersions, and surface-treated pigments (such as a pigment dispersed in a dispersion medium such as water, a liquid organic compound, or insoluble resin, and a pigment surface-treated with, for example, resin or a pigment derivative).

Examples of the organic pigments and inorganic pigments include yellow pigments, red pigments, magenta pigments, blue pigments, cyan pigments, green pigments, orange pigments, violet pigments, brown pigments, black pigments, and white pigments.

When a pigment is used as the coloring material, a pigment dispersing agent may be optionally used during preparation of pigment particles.

For the coloring materials such as pigments and the pigment dispersing agent, reference may be appropriately made to Paragraphs 0180 to 0200 of JP2014-040529A and Paragraphs 0122 to 0129 of WO2016/052053A.

Other Components

The aqueous dispersion according to the present disclosure may contain, as needed, other components different from the above-described components.

Such other components may be included in the cells of microcapsules (in other words, inside of microcapsules), or may be included outside of microcapsules.

Organic Solvent

The aqueous dispersion according to the present disclosure may contain at least one organic solvent.

When the aqueous dispersion according to the present disclosure contains an organic solvent, further enhanced adhesion between the film and the substrate can be provided.

When the aqueous dispersion according to the present disclosure contains an organic solvent, the organic solvent content relative to the total amount of the aqueous dispersion is preferably 0.05 mass % to 50 mass %, particularly preferably 0.1 mass % to 20 mass %.

Specific examples of the organic solvent are as follows:

alcohols (such as methanol, ethanol, propanol, isopropanol, butanol, isobutanol, secondary butanol, tertiary butanol, pentanol, hexanol, cyclohexanol, and benzyl alcohol), polyhydric alcohols (such as ethylene glycol, diethylene glycol, triethylene glycol, polyethylene glycol, propylene glycol, dipropylene glycol, polypropylene glycol, butylene glycol, hexanediol, pentanediol, glycerol, hexanetriol, thiodiglycol, and 2-methylpropanediol), polyhydric alcohol ethers (such as ethylene glycol monomethyl ether, ethylene glycol monoethyl ether, ethylene glycol monobutyl ether, diethylene glycol monoethyl ether, diethylene glycol monomethyl ether, diethylene glycol monobutyl ether, propylene glycol monomethyl ether, propylene glycol monobutyl ether, tripropylene glycol monomethyl ether, dipropylene glycol monomethyl ether, dipropylene glycol dimethyl ether, ethylene glycol monomethyl ether acetate, triethylene glycol monomethyl ether, triethylene glycol monoethyl ether, triethylene glycol monobutyl ether, ethylene glycol monophenyl ether, and propylene glycol monophenyl ether), amines (such as ethanolamine, diethanolamine, triethanolamine, N-methyldiethanolamine, N-ethyldiethanolamine, morpholine, N-ethylmorpholine, ethylenediamine, diethylenedi amine, triethylenetetramine, tetraethylenepentamine, polyethyleneimine, pentamethyldiethylenetri amine, and tetramethylpropylenediamine), amides (such as formamide, N,N-dimethylformamide, and N,N-dimethylacetamide), heterocycles (2-pyrrolidone, N-methyl-2-pyrrolidone, cyclohexylpyrrolidone, 2-oxazolidone, 1,3-dimethyl-2-imidazolidinone, and γ-butyrolactone), sulfoxides (such as dimethyl sulfoxide), sulfones (such as sulfolane), and others (such as urea, acetonitrile, and acetone).

Surfactant

The aqueous dispersion according to the present disclosure may contain at least one surfactant.

When the aqueous dispersion according to the present disclosure contains a surfactant, the dispersion or the composition including the dispersion exhibits enhanced wettability to substrates. Examples include nonionic surfactants such as polyoxyethylene alkyl ethers, polyoxyethylene alkylaryl ethers, acetylene glycols, polyoxyethylene/polyoxypropylene block copolymers, and siloxanes.

Other examples of the surfactant include fluoroorganic compounds. The fluoroorganic compounds are preferably hydrophobic.

The fluoroorganic compounds include fluorosurfactants, oily fluorocompounds (such as fluorinated oil), and solid fluorocompound resins (such as tetrafluoroethylene resin); examples include fluoroorganic compounds described in JP1982-9053B (JP-S57-9053B) (8th column to 17th column) and JP1987-135826A (JP-S62-135826A).

As described above, the aqueous dispersion according to the present disclosure, in which the shells of the microcapsules include, as hydrophilic groups, an anionic group and the specified nonionic group, has high dispersion stability of the microcapsules. Thus, the aqueous dispersion may contain substantially no anionic surfactants, which are added for enhancing dispersibility.

Herein, "contain substantially no" means that the content relative to the total amount of the aqueous dispersion is 1 mass % or less (preferably 0.1 mass % or less).

Such an embodiment in which the aqueous dispersion contains substantially no anionic surfactants is advantageous in that foaming of the aqueous dispersion and a composition using the aqueous dispersion is suppressed. The embodiment in which the aqueous dispersion contains substantially no anionic surfactants is also advantageous in that, in particular, when a pigment dispersion having an anionic dispersing group and the aqueous dispersion are combined, the phenomenon of degradation of dispersibility of the pigment is suppressed, the degradation being caused because an anionic surfactant causes an increase in the ion concentration of the system to cause a decrease in the degree of electrolytic dissociation of the anionic pigment dispersing agent.

In an embodiment of the aqueous dispersion according to the present disclosure, the anionic surfactant content relative to the total amount of the aqueous dispersion may be 1 mass % or less.

Antioxidant

The aqueous dispersion according to the present disclosure may include an antioxidant.

When the aqueous dispersion according to the present disclosure includes an antioxidant, the films can have higher weather resistance, for example.

Examples of the antioxidant include p-methoxyphenol, quinones (such as hydroquinone, benzoquinone, and methoxybenzoquinone), phenothiazine, catechols, alkylphenols (such as dibutylhydroxytoluene (BHT)), alkylbisphenols, zinc dimethyldithiocarbamate, copper dimethyldithiocarbamate, copper dibutyldithiocarbamate, copper salicylate, thiodipropionates, mercaptobenzimidazole, phosphites, 2,2,6,6-tetramethylpiperidine-1-oxyl (TEMPO), 2,2,6,6-tetramethyl-4-hydroxypiperidine-1-oxyl (TEMPOL), cupferron Al, and tris(N-nitroso-N-phenylhydroxyamine) aluminum salt.

Of these, the antioxidant is preferably at least one selected from the group consisting of p-methoxyphenol, catechols, quinones, alkylphenols, TEMPO, TEMPOL, cupferron Al, and tris(N-nitroso-N-phenylhydroxyamine) aluminum salt, more preferably at least one selected from the group consisting of p-methoxyphenol, hydroquinone, benzoquinone, BHT, TEMPO, TEMPOL, cupferron Al, and tris(N-nitroso-N-phenylhydroxyamine) aluminum salt.

Ultraviolet Absorbent

The aqueous dispersion according to the present disclosure may include an ultraviolet absorbent.

When the aqueous dispersion according to the present disclosure contains an ultraviolet absorbent, the films can have higher weather resistance, for example.

The ultraviolet absorbent is not particularly limited, and examples include publicly known ultraviolet absorbents such as benzotriazole-based compounds, benzophenone-based compounds, triazine-based compounds, and benzoxazole-based compounds.

Components that can be Contained Outside of Microcapsules

From the viewpoint of film properties, adhesion, and control of ejectability, the aqueous dispersion according to the present disclosure may contain, as needed, outside of microcapsules, for example, a water-soluble or water-dispersible components (such as a polymerizable compound or a resin).

This term "water-soluble" is a property in which the component having been dried at 105° C. for 2 hours has a solubility of more than 1 g in 100 g of distilled water at 25° C.

The other term "water-dispersible" is a property in which the component is water-insoluble and is dispersed in water. This term "water-insoluble" is a property in which the component having been dried at 105° C. for 2 hours has a solubility of 1 g or less in 100 g of distilled water at 25° C.

Examples of the component that can be contained outside of the microcapsules include components described in Paragraphs 0139 to 0157 of WO2016/052053A.

Preferred Properties of Aqueous Dispersion

In the aqueous dispersion according to the present disclosure set at 25° C. to 50° C., the aqueous dispersion preferably has a viscosity of 3 mPa·s to 15 mPa·s, more preferably 3 mPa·s to 13 mPa·s. In particular, when the aqueous dispersion according to the present disclosure is set at 25° C., the aqueous dispersion preferably has a viscosity of 50 mPa·s or less. When the aqueous dispersion has a viscosity satisfying such a range, the aqueous dispersion applied as ink to ink j et recording provides high ejection stability.

Incidentally, the viscosity of the aqueous dispersion is a value measured with a viscometer (VISCOMETER TV-22, Toki Sangyo Co., Ltd.).

Method for Producing Aqueous Dispersion

The method for producing the aqueous dispersion according to the present disclosure is not particularly limited as long as it enables production of the above-described aqueous dispersion.

The method for producing the aqueous dispersion according to the present disclosure is, from the viewpoint of ease of production of the above-described aqueous dispersion, preferably the following method for producing an aqueous dispersion according to this embodiment.

The method for producing an aqueous dispersion according to this embodiment (hereafter, also referred to as the "production method according to this embodiment") has a microcapsule-forming step of mixing an oil-phase component and an aqueous-phase component, and performing emulsification, to form the above-described microcapsule.

The oil-phase component includes an organic solvent, a tri- or higher functional isocyanate compound, and at least one of a thermal-polymerizable-group-introduced isocyanate compound or a thermal-polymerizable compound.

The aqueous-phase component includes water.

The production method according to this embodiment satisfies at least one of Condition (x-1) or Condition (x-2) below, Condition (x-1): the oil-phase component includes a specified-nonionic-group-introduced isocyanate compound, Condition (x-2): at least one of the oil-phase component or the aqueous-phase component includes a compound having the specified nonionic group and an active hydrogen group.

In addition, the production method according to this embodiment satisfies at least one of Condition (y-1) or Condition (y-2) below, Condition (y-1): the oil-phase component includes an anionic-group-introduced isocyanate compound, Condition (y-2): at least one of the oil-phase component or the aqueous-phase component includes a compound having an anionic group and an active hydrogen group.

In the production method according to this embodiment, at least one of the oil-phase component or the aqueous-phase component may include the above-described compound having two or more active hydrogen groups.

Microcapsule-Forming Step

In the microcapsule-forming step, the oil-phase component and the aqueous-phase component are mixed, and the resultant mixture is emulsified, to thereby form microcapsules in which a shell having a three-dimensionally cross-linked structure is formed so as to surround a core. The microcapsules formed will be dispersoid in the aqueous dispersion to be produced.

On the other hand, water in the aqueous-phase component will be a dispersion medium in the aqueous dispersion to be produced.

Specifically, in the microcapsule-forming step, a reaction of a tri- or higher functional isocyanate compound and water forms shells having three-dimensionally crosslinked structures including urea bonds.

When the tri- or higher functional isocyanate compound has a urethane bond, the three-dimensionally crosslinked structures of the shells also include urethane bonds.

When at least one of the oil-phase component or the aqueous-phase component includes the above-described compound having two or more active hydrogen groups, as a result of the reaction between a tri- or higher functional isocyanate compound and the compound having two or more active hydrogen groups, shells having three-dimensionally crosslinked structures including urethane bonds are formed.

In the production method according to this embodiment, a compound having the specified nonionic group and an active hydrogen group, and a specified-nonionic-group-introduced isocyanate compound are both materials for introducing the specified nonionic group into the shells.

Specifically, when at least one of the oil-phase component or the aqueous-phase component includes a compound having the specified nonionic group and an active hydrogen group, a reaction of the active hydrogen group of this compound and an isocyanate group of an isocyanate compound contained in the mixture (such as a tri- or higher functional isocyanate compound) causes introduction of the specified nonionic group into the shells (that is, shells having the specified nonionic group are formed).

On the other hand, when the oil-phase component includes a specified-nonionic-group-introduced isocyanate compound, since this specified-nonionic-group-introduced isocyanate compound also contributes to the shell-forming reaction, the specified nonionic group is introduced into the shells (that is, shells having the specified nonionic group are formed).

In an embodiment in which the oil-phase component includes a specified-nonionic-group-introduced isocyanate compound, shells having the specified nonionic group are more easily formed. From this point of view, the embodiment is preferred in which the oil-phase component includes a specified-nonionic-group-introduced isocyanate compound.

The compound having an anionic group and an active hydrogen group and the anionic-group-introduced isocyanate compound are both materials for introducing an anionic group into the shells.

Specifically, when at least one of the oil-phase component or the aqueous-phase component includes a compound having an anionic group and an active hydrogen group, a reaction of the active hydrogen group of this compound and an isocyanate group of an isocyanate compound contained in the mixture (such as a tri- or higher functional isocyanate compound) causes introduction of the anionic group into the shells (that is, shells having the anionic group are formed).

On the other hand, when the oil-phase component includes an anionic-group-introduced isocyanate compound, this anionic-group-introduced isocyanate compound also contributes to the shell-forming reaction, so that the anionic group is introduced into the shells (that is, shells having the anionic group are formed).

An embodiment in which at least one of the oil-phase component or the aqueous-phase component includes a compound having an anionic group and an active hydrogen group has advantages in that a material, specifically, the compound having an anionic group and an active hydrogen group (for example, an α-amino acid such as lysine) is easily prepared. From such a point of view, the embodiment is preferred in which at least one of the oil-phase component or the aqueous-phase component includes a compound having an anionic group and an active hydrogen group. In this embodiment, more preferably, the compound having an anionic group and an active hydrogen group is included at least in the aqueous-phase component.

On the other hand, from the viewpoint of ease of formation of shells having an anionic group, an embodiment is also preferred in which the oil-phase component includes an anionic-group-introduced isocyanate compound.

In the oil-phase component in this embodiment, "at least one of the thermal-polymerizable-group-introduced isocyanate compound or the thermal-polymerizable compound" is a material for introducing a thermal-polymerizable group into the microcapsules.

Specifically, when the oil-phase component includes a thermal-polymerizable compound, shells having a three-dimensionally crosslinked structure are formed so as to surround cores including the thermal-polymerizable compound (specifically, cores having a thermal-polymerizable group) (that is, microcapsules including cores including the thermal-polymerizable compound and shells are formed).

On the other hand, when the oil-phase component includes a thermal-polymerizable-group-introduced isocyanate compound, since this thermal-polymerizable-group-introduced isocyanate compound also contributes to the shell-forming reaction, the thermal-polymerizable group is introduced into the shells (specifically, shells having the thermal-polymerizable group are formed).

The embodiment in which the oil-phase component includes a thermal-polymerizable compound is advantageous in that the material (thermal-polymerizable compound) can be selected from a wide range of choices.

On the other hand, in an embodiment in which the oil-phase component includes a thermal-polymerizable-group-introduced isocyanate compound, during formation of a film with the aqueous dispersion produced, crosslinking between the microcapsules is more easily formed by heating or irradiation with infrared radiation. Thus, the embodiment is advantageous in the hardness of the film formed.

Examples of the organic solvent included in the oil-phase component include ethyl acetate and methyl ethyl ketone.

The organic solvent is preferably at least partially removed during formation of microcapsules or after formation of microcapsules.

During formation of microcapsules, the organic solvent may remain as one of the components of the cores.

The details of the above-described tri- or higher functional isocyanate compound, compound having two or more active hydrogen groups, compound having the specified nonionic group and an active hydrogen group, specified-nonionic-group-introduced isocyanate compound, thermal-polymerizable-group-introduced isocyanate compound, thermal-polymerizable compound, compound having an anionic group and an active hydrogen group, and anionic-group-introduced isocyanate compound are described in the above-described section "Aqueous dispersion".

In the production method according to this embodiment, the total amount of the oil-phase component and the aqueous-phase component except for the organic solvent and water corresponds to the total solid content of microcapsules in the aqueous dispersion to be produced.

Regarding the preferred ranges of amounts of components used in the production method according to this embodiment, reference may be made to the above-described section "Aqueous dispersion". In this reference to the above-described section "Aqueous dispersion", the "content" and the "total solid content of the microcapsules" are respectively replaced by "amount of use" and "relative to the total amount of the oil-phase component and the aqueous-phase component except for the organic solvent and water".

In the production method according to this embodiment, when the oil-phase component includes a specified-nonionic-group-introduced isocyanate compound, the total content of the tri- or higher functional isocyanate compound and the specified-nonionic-group-introduced isocyanate compound relative to the total amount of the oil-phase component and the aqueous-phase component except for the organic solvent and water, is preferably 5 mass % to 50 mass %, more preferably 10 mass % to 45 mass %, particularly preferably 15 mass % to 40 mass %.

In the production method according to this embodiment, when the oil-phase component includes a specified-nonionic-group-introduced isocyanate compound, the amount of the specified nonionic group in the specified-nonionic-group-introduced isocyanate compound relative to the total content of the tri- or higher functional isocyanate compound and the specified-nonionic-group-introduced isocyanate compound, is preferably 20 mass % to 80 mass %, more preferably 30 mass % to 70 mass %, particularly preferably 40 mass % to 60 mass %.

In the production method according to this embodiment, the total isocyanate-compound content in the oil-phase component relative to the total amount of the oil-phase component and the aqueous-phase component except for the organic solvent and water, is preferably 5 mass % to 90 mass %, more preferably 10 mass % to 80 mass %, particularly preferably 15 mass % to 75 mass %.

At least one of the oil-phase component and the aqueous-phase component may contain basic compound as a neutralizer for an unneutralized anionic group (such as a carboxy group, a sulfo group, a phosphoric acid group, a phosphonic acid group, or a sulfuric acid group). This forms, during formation of the microcapsules, a neutralized anionic group (specifically, an anionic group in the form of salt such as a salt of a carboxy group, a salt of a sulfo group, a salt of a phosphoric acid group, a salt of a phosphonic acid group, or a salt of a sulfuric acid group).

When the basic compound (neutralizer) is used, the basic compound (neutralizer) is preferably contained at least in the aqueous-phase component.

Examples of the basic compound include inorganic bases such as sodium hydroxide and potassium hydroxide, and organic bases such as triethylamine. In particular, preferred basic compounds are inorganic bases such as sodium hydroxide and potassium hydroxide.

Examples of the salt of the anionic group in the form of salt include alkali metal salts such as sodium salt and potassium salt; and organic amine salts such as triethylamine salt. Of these, the salt of the anionic group in the form of salt is preferably an alkali metal salt such as sodium salt or potassium salt.

The components included in the oil-phase component may be simply mixed: all the components may be mixed all at once, or the components may be divided into several groups and mixed.

As in the oil-phase component, the components included in the aqueous-phase component may be simply mixed: all the components may be mixed all at once, or the components may be divided into several groups and mixed.

The method of mixing the oil-phase component and the aqueous-phase component is not particularly limited, and the mixing may be performed by, for example, stirring.

The method of emulsifying the mixture obtained by mixing is not particularly limited, and is, for example, emulsification using an emulsification device such as a homogenizer (such as a dispersing device).

In the emulsification, the number of rounds of such a dispersing device is, for example, 5000 rpm to 20000 rpm, preferably 10000 rpm to 15000 rpm.

In the emulsification, the time of rounds is, for example, 1 minute to 120 minutes, preferably 3 minutes to 60 minutes, more preferably 3 minutes to 30 minutes, still more preferably 5 minutes to 15 minutes.

The emulsification in the microcapsule-forming step may be performed under heating.

The emulsification under heating causes the emulsification reaction of forming microcapsules to more efficiently proceed. When the emulsification is performed under heating, at least a portion of the organic solvent included as the oil-phase component is easily removed from the mixture.

When the emulsification is performed under heating, the heating temperature (namely, reaction temperature) is preferably 35° C. to 70° C., more preferably 40° C. to 60° C.

When the emulsification is performed under heating, the heating time (namely, reaction time) is preferably 6 hours to 50 hours, more preferably 12 hours to 40 hours, still more preferably 15 hours to 35 hours.

The microcapsule-forming step may include an emulsification stage of emulsifying the mixture (at a temperature of less than 35° C., for example), and a heating stage of heating (at a temperature of 35° C. or more, for example) the emulsion obtained in the emulsification stage.

In the embodiment in which the microcapsule-forming step includes the emulsification stage and the heating stage, shells having a stronger three-dimensionally crosslinked structure are formed. This enables production of an aqueous dispersion that enables formation of films having higher hardness.

In the embodiment in which the microcapsule-forming step includes the emulsification stage and the heating stage, the preferred ranges of the heating temperature and heating time in the heating stage are the same as the preferred ranges of the heating temperature and heating time in the case of performing emulsification under heating.

The heating stage may include a first heating stage of removing the organic solvent from the emulsion, and a second heating stage of heating the emulsion at a temperature higher than that in the first heating stage.

Such an embodiment in which the heating stage includes the first heating stage and the second heating stage enables formation of shells having an even stronger three-dimensionally crosslinked structure, which is more preferred.

Preferred embodiments of the production method according to this embodiment include the following Embodiments (1) to (5).

In Embodiment (1), the oil-phase component includes an organic solvent, a tri- or higher functional isocyanate compound, a specified-nonionic-group-introduced isocyanate compound, and a thermal-polymerizable compound, and the aqueous-phase component includes water and a compound having an anionic group and an active hydrogen group.

In Embodiment (2), the oil-phase component includes an organic solvent, a tri- or higher functional isocyanate compound, a compound having the specified nonionic group and an active hydrogen group, and a thermal-polymerizable compound, and the aqueous-phase component includes water and a compound having an anionic group and an active hydrogen group.

In Embodiment (3), the oil-phase component includes an organic solvent, a tri- or higher functional isocyanate compound, a specified-nonionic-group-introduced isocyanate compound, an anionic-group-introduced isocyanate compound, and a thermal-polymerizable compound, and the aqueous-phase component includes water.

In Embodiment (4), the oil-phase component includes an organic solvent, a tri- or higher functional isocyanate compound, a specified-nonionic-group-introduced isocyanate compound, a thermal-polymerizable-group-introduced isocyanate compound, and a thermal-polymerizable compound, and the aqueous-phase component includes water and a compound having an anionic group and an active hydrogen group.

In Embodiment (5), the oil-phase component includes an organic solvent, a tri- or higher functional isocyanate compound, a specified-nonionic-group-introduced isocyanate compound, an anionic-group-introduced isocyanate compound, and a thermal-polymerizable-group-introduced isocyanate compound, and the aqueous-phase component includes water.

Another Step

The production method according to this embodiment may have, in addition to the microcapsule-forming step, another step as needed.

Such another step may be a step of adding another component.

Such another component added is the same as the components described above as other components that can be contained in the aqueous dispersion.

Image-Forming Method

The image-forming method using the above-described aqueous dispersion is not particularly limited.

The image-forming method according to the present disclosure is, from the viewpoint of forming an image having high hardness on a recording medium, preferably the following image-forming method according to this embodiment.

The image-forming method according to this embodiment has an application step of applying the above-described aqueous dispersion according to the present disclosure onto a recording medium, and a curing step of curing the aqueous dispersion applied on the recording medium by heating or irradiation with infrared radiation.

The image-forming method according to this embodiment forms an image having high hardness on a recording medium. The image formed also has high adhesion to the recording medium.

Application Step

The application step is a step of applying the aqueous dispersion according to the present disclosure onto a recording medium.

An embodiment of applying the aqueous dispersion onto a recording medium is particularly preferably an embodiment in which the aqueous dispersion according to the present disclosure is used as an ink-jet ink, and the aqueous dispersion (namely, an ink-jet ink) is applied onto a recording medium by an ink jet method.

The recording medium may be the above-described substrate (such as a plastic substrate).

This application of the aqueous dispersion onto a recording medium by an ink jet method can be performed with a publicly known ink jet recording apparatus.

The ink jet recording apparatus is not particularly limited, and a publicly known ink jet recording apparatus that provides a target resolution can be freely selected and used.

Specifically, any such publicly known ink jet recording apparatuses including commercially available products can be used to apply the aqueous dispersion onto a recording medium by the image-forming method according to this embodiment.

Such an ink jet recording apparatus is, for example, an apparatus including an ink supply device, a temperature sensor, heating means, and the like.

The ink supply device includes, for example, a source tank including ink that is the aqueous dispersion according to the present disclosure, supply pipes, an ink supply tank disposed immediately upstream of an ink jet head, a filter, and a piezo ink jet head. The piezo ink jet head may be operated so as to eject multisize dots of preferably 1 pl to 100 pl, more preferably 8 pl to 30 pl, at a resolution of preferably 320 dpi (dot per inch)×320 dpi to 4000 dpi×4000 dpi, more preferably 400 dpi×400 dpi to 1600 dpi×1600 dpi, still more preferably 720 dpi×720 dpi. Herein, dpi means the number of dots for 2.54 cm (1 inch).

Curing Step

The curing step is a step of curing the aqueous dispersion applied on a recording medium by heating or irradiation with infrared radiation.

The aqueous dispersion applied on a recording medium is cured by heating or irradiation with infrared radiation to cause a crosslinking reaction of the thermal-polymerizable group in microcapsules in the aqueous dispersion. This enables fixing of the image and enhancement of, for example, the film hardness of the image.

The heating means for the heating is not particularly limited, and examples include a heating drum, hot air, an infrared lamp, an infrared LED, an infrared heater, a heating oven, a heating plate, an infrared laser, and an infrared dryer. Of these, from the viewpoint that the aqueous dispersion can be efficiently heat-cured, preferred are a light-emitting diode (LED) having a maximum absorption wavelength in the wavelengths of 0.8 μm to 1.5 μm or 2.0 μm to 3.5 μm and having emission wavelengths from near-infrared radiation to far-infrared radiation; a heater that radiates near-infrared radiation to far-infrared radiation; a laser having lasing wavelengths from near-infrared radiation to far-infrared radiation; and a dryer that radiates near-infrared radiation to far-infrared radiation.

The heating temperature during the heating is preferably 40° C. or more, more preferably 40° C. to 200° C., still more preferably 100° C. to 180° C. The heating temperature is the temperature of the aqueous dispersion on a recording medium, and can be measured with a thermograph using an infrared thermography apparatus H2640 (manufactured by Nippon Avionics Co., Ltd.).

The heating time can be appropriately set in accordance with, for example, the heating temperature, the composition of the aqueous dispersion, and printing speed.

The curing step of causing heat-curing of the aqueous dispersion applied on a recording medium may also serve as a heat-drying step described later.

Another Step

The image-forming method according to this embodiment may have, in addition to the above-described application step and the curing step, another step.

Examples of the other step include a heat-drying step.

Heat-Drying Step

The image-forming method according to this embodiment may further have, as needed, a heat-drying step of heat-drying an aqueous dispersion on a recording medium, the step being performed after the application step and before the curing step.

In the heat-drying step, water and an organic solvent used as needed in combination with water are evaporated from the aqueous dispersion applied onto a recording medium, to thereby fix the image.

The heating means for performing the heat-drying is not particularly limited. Examples of the heating means include a heating drum, hot air, an infrared lamp, a heating oven, and a heating plate.

The heating temperature is preferably 40° C. or more, more preferably 40° C. to 150° C., still more preferably 40° C. to 80° C.

Incidentally, the heating time can be appropriately set in accordance with, for example, the composition of the aqueous dispersion and printing speed.

EXAMPLES

Hereinafter, the present invention will be described with reference to Examples. However, the present invention is not limited to the following Examples.

Preparation of Material for Introducing Specified Nonionic Group into Shells

As a material for introducing the specified nonionic group into shells (specified-nonionic-group-introduced isocyanate compound), the following material was prepared.

"TAKENATE (registered trademark) D-116N" manufactured by Mitsui Chemicals, Inc.: 50 mass % ethyl acetate solution of adduct of trimethylolpropane (TMP), m-xylylene diisocyanate (XDI), and polyethylene glycol monomethyl ether (EO90); the structure is described below.

This adduct is a mixture of a trifunctional isocyanate compound and an isocyanate compound having an introduced specified nonionic group (specifically, a group represented by the above-described Formula (W) where $R^{W1}$ is an ethylene group, $R^{W2}$ is a methyl group, and nw is 90).

The specified-nonionic-group-introduced isocyanate compound contributes to introduction of the specified nonionic group into the shells. The trifunctional isocyanate compound contributes to formation of the shells having a three-dimensionally crosslinked structure.

In this adduct (specifically, the solid content of D-116N), the content of the specified nonionic group (specifically, the group (W) represented by the above-described Formula (W) where $R^{W1}$ is an ethylene group, $R^{W2}$ is a methyl group, and nw is 90) relative to the entirety of the adduct is 50 mass %.

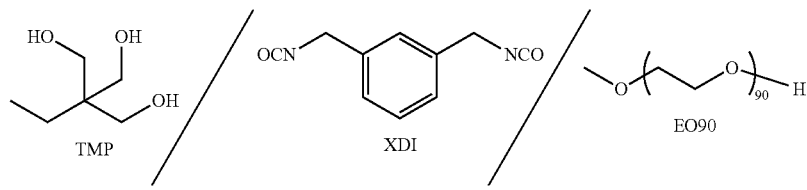

Preparation of Comparative Materials

As comparative materials, the following materials for introducing nonionic groups other than specified nonionic groups into shells were prepared.

PEG1000diamine (comparative material): polyethylene glycol having amino groups at both ends (NOF CORPORATION, number-average molecular weight: 1000)

scribed Structure (X2) is formed as a partial structure (moiety including an anionic group) of the shells.

The materials have the following anionic-group amounts per gram (mmol/g): 6.84 mmol/g (lysine), 11.22 mmol/g (β-alanine), 7.99 mmol/g (taurine), 14.18 mmol/g (EAP), 1.248 mmol/g (COOH—NCO-1), 1.128 mmol/g (COOH—NCO-2), and 1.159 mmol/g (COOH—NCO-3).

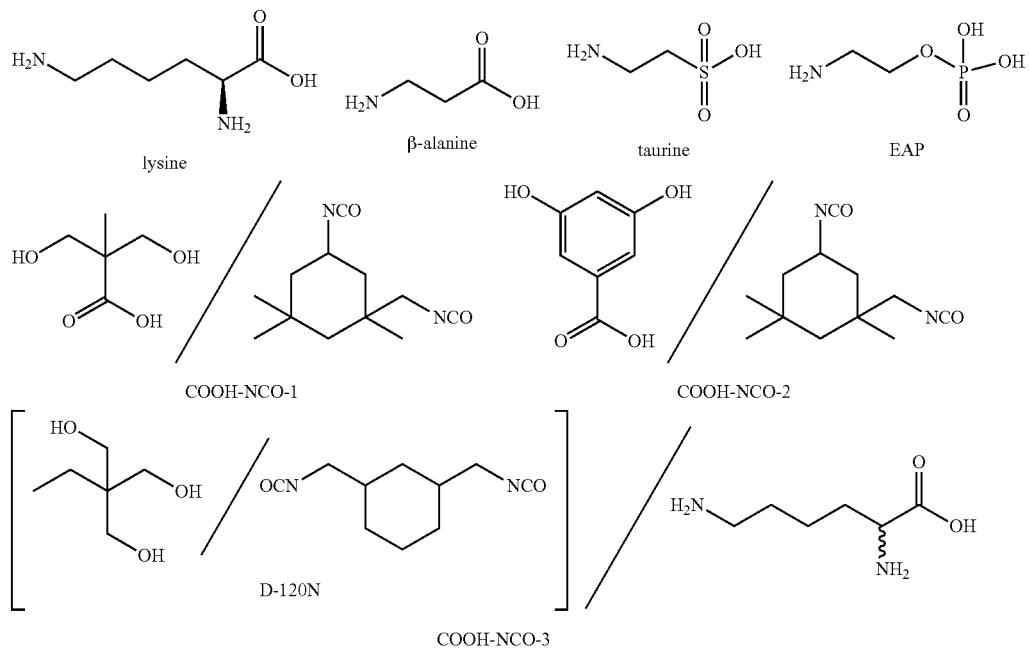

PTMG1000 (comparative material): polyether polyol having OH groups at both ends (Mitsubishi Chemical Corporation, number-average molecular weight: 1000)

Preparation of Materials for Introducing Anionic Group into Shells

As materials for introducing an anionic group into shells, compounds having an anionic group and an active hydrogen group were prepared: lysine (hereafter, also referred to as "lysine"), β-alanine (hereafter, also referred to as "β-alanine"), taurine (hereafter, also referred to as "taurine"), and ethanolamine phosphate (hereafter, also referred to as "EAP"). The structures of these compounds are described below.

In addition, as materials for introducing an anionic group into shells, anionic-group-introduced isocyanate compounds were prepared: COOH—NCO-1, COOH—NCO-2, and COOH—NCO-3. The structures of these compounds are described below.

As the materials for introducing an anionic group into shells, when lysine and COOH—NCO-3 are employed, the above-described Structure (X3) is formed as a partial structure (moiety including an anionic group) of the shells.

As the materials for introducing an anionic group into shells, when β-alanine, taurine, and EAP are employed, the above-described Structure (X4) is formed as a partial structure (moiety including an anionic group) of the shells.

As the material for introducing an anionic group into shells, when COOH—NCO-1 is employed, the above-described Structure (X1) is formed as a partial structure (moiety including an anionic group) of the shells.

As the material for introducing an anionic group into shells, when COOH—NCO-2 is employed, the above-de- COOH—NCO-1, COOH—NCO-2, and COOH—NCO-3 were synthesized in the following manner.

Synthesis of COOH—NCO-1

To a three-neck flask, 2,2-dimethylolpropionate (DMPA) (45 g), isophorone diisocyanate (hereafter, also referred to as "IPDI") (223.72 g), and ethyl acetate (499.05 g) were added and heated at 50° C. To this, NEOSTANN (registered trademark) U-600 (manufactured by Nitto Kasei Co., Ltd., inorganic bismuth catalyst; hereafter, also simply referred to as "U-600") (0.7677 g) was added, and a reaction was caused for 3 hours, to obtain COOH—NCO-1 (solid content concentration: 35 mass %).

Synthesis of COOH—NCO-2

To a three-neck flask, ca-resorcylic acid (45 g), IPDI (194.7 g), and ethyl acetate (445.2 g) were added, and heated at 50° C. To this, U-600 (0.7677 g) was added, and a reaction was caused for 3 hours, to obtain COOH—NCO-2 (solid content concentration: 35 mass %).

Synthesis of COOH—NCO-3

To a three-neck flask, lysine (lysine) 45 g, D-120N (294.07 g), and ethyl acetate (419.16 g) were added, and heated at 50° C. To this, U-600 (0.7677 g) was added, and a reaction was caused for 3 hours, to obtain COOH—NCO-3 (solid content concentration: 35 mass %).

This D-120 is TAKENATE (registered trademark) D-120 described later.

Preparation of Other Materials for Forming Shells

As other materials for forming shells, the following materials were prepared.

TAKENATE (registered trademark) D-110N from Mitsui Chemicals, Inc.: 75 mass % ethyl acetate solution of adduct (trifunctional isocyanate compound) of trimethylolpropane (TMP) and xylylene diisocyanate (XDI).

TAKENATE (registered trademark) D-120N from Mitsui Chemicals, Inc.: 75 mass % ethyl acetate solution of adduct (trifunctional isocyanate compound) of trimethylolpropane (TMP) and 1,3-bis(isocyanatomethyl)cyclohexane (HXDI).

PEG1000diamine (comparative material): polyethylene glycol (NOF CORPORATION, amines at both ends, molecular weight: 1000)

PTMG1000 (comparative material): polyether polyol (Mitsubishi Chemical

Corporation, molecular weight: 1000)

Preparation of Thermal-Polymerizable Compounds as Core Materials

As core materials that are thermal-polymerizable compounds, the following thermal-polymerizable monomers were prepared.

Blocked isocyanate A: Trixene™BI7982 (blocked isocyanate, Baxenden Chemicals Ltd, molecular weight: 793) from which propylene glycol monomethyl ether had been driven off under conditions of 60° C. and 2.67 kPa (20 torr)

Epoxy resin A: EPICLON TM840 (thermal-polymerizable oligomer having epoxy group, DIC Corporation, molecular weight: 340) Preparation of thermal curing accelerator as core material As a core material that is a thermal curing accelerator, 2-methylimidazole was prepared.

Examples 1 to 11 and Comparative Examples 1 to 4

Production of Aqueous Dispersions of Microcapsules in Examples 1 to 6, 8, and 9, and Comparative Examples 1 to 4

As aqueous dispersions in which, as materials for introducing an anionic group, materials other than COOH—NCO-1, COOH—NCO-2, and COOH—NCO-3 were employed, aqueous dispersions of microcapsules in Examples 1 to 6, 8, and 9 and Comparative Examples 1 to 4 were produced. Hereinafter, this will be described in detail.

Preparation of Oil-Phase Component

Among the components in Table 3-1 below, components other than the material for introducing an anionic group and 55 g of ethyl acetate were mixed, and stirred at room temperature for 15 minutes to obtain an oil-phase component.

Preparation of Aqueous-Phase Component

The material for introducing an anionic group in Table 3-1 below was dissolved in 50 g of distilled water to obtain an aqueous-phase component.

Microcapsule-Forming Step

To the oil-phase component, the aqueous-phase component was added and mixed. The resultant mixture was emulsified with a homogenizer at 12000 rpm for 12 minutes to obtain an emulsion.

The obtained emulsion was added to 25 g of distilled water. The resultant liquid was stirred at room temperature for 30 minutes.

Subsequently, the stirred liquid was heated at 45° C., and stirred for 4 hours while the liquid temperature was kept at 45° C., to drive off ethyl acetate from the liquid. Subsequently, the liquid from which ethyl acetate had been driven off was heated at 50° C., and stirred for 24 hours while the liquid temperature was kept at 50° C., to form microcapsules in the liquid. Subsequently, the liquid including microcapsules was diluted with distilled water so as to have a solid content concentration of 20 mass %. In this way, aqueous dispersions of microcapsules were obtained (aqueous dispersions of microcapsules in Examples 1 to 6, 8, and 9, and Comparative Examples 1 to 4).

Production of Aqueous Dispersions of Microcapsules in Examples 7, 10, and 11

As aqueous dispersions in which the material for introducing an anionic group was COOH—NCO-1, COOH—NCO-2, or COOH—NCO-3, aqueous dispersions of microcapsules in Examples 7, 10, and 11 were produced. Hereinafter, this will be described in detail.

Preparation of Oil-Phase Component

All the components in Table 3-1 below and 19 g of ethyl acetate were mixed, and stirred at room temperature for 15 minutes to obtain an oil-phase component.

Preparation of Aqueous-Phase Component

As an aqueous-phase component, 43.1 g of distilled water was prepared.

Microcapsule-Forming Step

To the oil-phase component, the aqueous-phase component was added and mixed. The resultant mixture was emulsified with a homogenizer at 12000 rpm for 12 minutes to obtain an emulsion.

The obtained emulsion was added to 10 g of distilled water. The resultant liquid was stirred at room temperature for 30 minutes.

Subsequently, the stirred liquid was heated at 45° C., and stirred for 4 hours while the liquid temperature was kept at 45° C., to drive off ethyl acetate from the liquid. Subsequently, the liquid from which ethyl acetate had been driven off was heated at 50° C., and stirred for 24 hours while the liquid temperature was kept at 50° C., to form microcapsules in the liquid. Subsequently, the liquid including microcapsules was diluted with distilled water so as to have a solid content concentration of 20 mass %. In this way, aqueous dispersions of microcapsules were obtained (aqueous dispersions of microcapsules in Examples 7, 10, and 11).

Determination in Terms of Aqueous Dispersions of Microcapsules

The aqueous dispersions of microcapsules in Examples 1 to 11 and Comparative Examples 1 to 4 were determined in terms of the following items.

Volume-Average Particle Size of Microcapsules

The volume-average particle size of microcapsules was measured by a light scattering method. Incidentally, the volume-average particle size of microcapsules was measured by a light scattering method using a wet particle size distribution analyzer LA-960 (HORIBA, Ltd.).

As a result, microcapsules included in each of the aqueous dispersions of Examples 1 to 11 and Comparative Examples 1 to 4 were found to have a volume-average particle size in a range of 0.10 μm to 0.20 μm.

Determination as to Whether or not Shells of Microcapsules have Three-Dimensionally crosslinked structure Whether or not the shells of microcapsules actually had a three-dimensionally crosslinked structure was determined in the following manner. Incidentally, the following procedures were performed under a condition of a liquid temperature of 25° C.

A sample was obtained from the above-described aqueous dispersion of microcapsules. To the obtained sample, tetrahydrofuran (THF) in an amount of 100 mass times the total solid content (microcapsules in this Example) of the sample was added and mixed, to prepare a diluted solution of the aqueous dispersion. The obtained diluted solution was centrifuged (80000 rpm, 40 minutes). After the centrifugation, whether residue was present or not was visually determined.

When residue was found, water was added to the residue and stirred with a stirrer for 1 hour to re-disperse the residue again in water. Thus, a re-dispersion liquid was obtained. The obtained re-dispersion liquid was subjected to measurement of particle size distribution performed with a wet particle size distribution analyzer (LA-960, HORIBA, Ltd.) by a light scattering method. When these procedures were performed and particle size distribution was detected, the shells of the microcapsules were regarded as having a three-dimensionally crosslinked structure.

As a result, the shells of microcapsules included in each of the aqueous dispersions in Examples 1 to 11 and Comparative Examples 1 to 4 were determined to have a three-dimensionally crosslinked structure.

Determination as to Whether or not Cores of Microcapsules Include Thermal-Polymerizable Compound The aqueous dispersions of microcapsules were measured in terms of enclosure ratio (%) of a thermal-polymerizable compound, to thereby determine whether or not the cores of microcapsules actually included the thermal-polymerizable compound. This will be described below in detail. Incidentally, the following procedures were performed under a condition of a liquid temperature of 25° C.

From the aqueous dispersion of microcapsules, two samples having the same mass (hereafter, referred to as "Sample 1A" and "Sample 2A") were obtained.

To Sample 1A, tetrahydrofuran (THF) in an amount of 100 mass times the total solid content of Sample 1A was added, and mixing was performed to prepare a diluted solution. The obtained diluted solution was centrifuged at 80000 rpm for 40 minutes. A supernatant liquid generated by the centrifugation (hereafter, referred to as "Supernatant liquid 1A") was collected. The collected Supernatant liquid 1A was measured for the mass of the thermal-polymerizable compound included therein with a liquid chromatography apparatus "Waters2695" from Waters. The determined mass of the thermal-polymerizable compound was defined as the "total amount of thermal-polymerizable compound".

In addition, Sample 2A was centrifuged under the same conditions as in the centrifugation performed for the diluted solution. A supernatant liquid generated by the centrifugation (hereafter, referred to as "Supernatant liquid 2A") was collected. The collected Supernatant liquid 2A was measured for the mass of the thermal-polymerizable compound included therein with the above-described liquid chromatography apparatus. The determined mass of the thermal-polymerizable compound was defined as the "amount of free thermal-polymerizable compound".

From the "total amount of thermal-polymerizable compound" and the "amount of free thermal-polymerizable compound", the enclosure ratio (mass %) of the thermal-polymerizable compound was calculated using the following formula.

Enclosure ratio (mass %) of thermal-polymerizable compound=((Total amount of thermal-polymerizable compound−Amount of free thermal-polymerizable compound)/Total amount of thermal-polymerizable compound)×100

The results have demonstrated the following: the aqueous dispersions of Examples 1 to 11 and Comparative Examples 1 to 4 each have an enclosure ratio of the thermal-polymerizable compound of 99% or more in the aqueous dispersion, so that the cores of the microcapsules actually include the thermal-polymerizable compound.

Production of Ink-Jet Inks (Colorless Inks)

Components described in "Composition of colorless inks" below were mixed to produce ink-jet inks.

The produced ink-jet inks are also embodiments of the aqueous dispersions of microcapsules.

In the present EXAMPLES, the ink-jet inks produced here are referred to as "colorless inks", as being different from the aqueous dispersions of microcapsules produced above.

Composition of Colorless Inks

Aqueous dispersion of microcapsules: 50 g

Fluorosurfactant (nonionic surfactant) (trade name: CAPSTONE (registered trademark) FS-31, E. I. du Pont de Nemours and Company, solid content concentration: 25 mass %): 0.3 g Glycerol (organic solvent): 5 g Water: 45 g Evaluations of Colorless Inks The colorless inks obtained above were evaluated in terms of the following items. The results are described in Table 3-2.

Pencil Hardness of Cured Films

A colorless ink obtained above was applied to a substrate that was a polystyrene (PS) sheet ("falcon hi impact polystyrene" manufactured by Robert Horne Group Limited) with a No. 2 bar of a K Hand Coater manufactured by RK PRINT COAT INSTRUMENTS LTD, so as to have a thickness of 10 µm. The obtained coating film was dried by being heated at 60° C. for 3 minutes. Subsequently, the dried coating film was irradiated with ultraviolet radiation (UV light) to cure the coating film. In this way, cured films were obtained.

Incidentally, the irradiation with ultraviolet radiation (UV light) was performed with a laboratory UV mini conveyor apparatus CSOT (manufactured by GS Yuasa Power Supply Ltd.) including, as an exposure light source, an ozoneless metal halide lamp MAN250L, and set at a conveyor speed of 35 m/min and an exposure intensity of 2.0 W/cm$^2$.

The obtained cured films were subjected to a pencil hardness test with pencils of UNI (registered trademark) manufactured by Mitsubishi Pencil Co., Ltd., in accordance with JIS K5600-5-4 (1999).

Incidentally, the pencil hardness that is acceptable is HB or higher, preferably H or higher. Cured films having a pencil hardness of B or lower are not preferred because they may become scratched during handling.

Adhesion (Cross Hatch Test)

Cured films were formed as with the above-described formation of the cured films in the evaluation of pencil hardness.

The obtained cured films were subjected to a cross hatch test in accordance with ISO2409 (cross-cut method). The adhesion to the substrates was evaluated in accordance with evaluation grades below.

In this cross hatch test, cutting was performed at a pitch of 1 mm to form a grid of 25 squares having 1 mm sides.

In the evaluation grades below, Grade A means that the cured film has the highest adhesion. In the evaluation grades below, Grades that are practically acceptable are A and B.

In the evaluation grades below, the ratio (%) of flaking squares is a value calculated using the following formula. In the following formula, the total number of squares is 25.

Ratio (%) of flaking squares=[(number of flaking squares)/(total number of squares)]×100

Evaluation Grades of Adhesion of Cured Films

A: The ratio (%) of flaking squares was 0%.

B: The ratio (%) of flaking squares was more than 0% and 5% or less.

C: The ratio (%) of flaking squares was more than 5%.

Ejectability of Colorless Inks

As one of indexes of dispersion stability of the colorless inks, the ejectability of the colorless inks was evaluated.

A colorless ink obtained above (within 1 day from production, kept at room temperature) was ejected through the head of an ink jet printer (SP-300V, manufactured by Roland DG Corporation) for 30 minutes (first ejection), and then the ejection was terminated.

After predetermined periods of time elapsed from the termination of ejection, the colorless ink was again ejected through the head onto a substrate that was a polyvinyl chloride (PVC) sheet (AVERY 400 GLOSS WHITE PERMANENT, AVERY DENNISON CORPORATION) to form a 5 cm×5 cm solid image.

The obtained image was visually inspected for missing dots due to, for example, nozzles turned into a non-ejection state, and the ejectability of the colorless ink was evaluated in accordance with the following evaluation grades.

In the evaluation grades below, Grade A means that the colorless ink has the highest ejectability. In the evaluation grades below, Grades that are practically acceptable are A, B, and C.

Evaluation Grades of Ejectability of Colorless Inks

A: After 5 minutes elapsed from the termination of the first ejection, ejection was performed without generation of missing dots due to, for example, nozzles turned into a non-ejection state, and good images were obtained.

B: After 4 minutes elapsed from the termination of the first ejection, ejection was performed without generation of missing dots due to, for example, nozzles turned into a non-ejection state, and good images were obtained; however, after 5 minutes elapsed from the termination of the first ejection, ejection was performed with slight generation of missing dots that did not bring practical problems.

C: After 3 minutes elapsed from the termination of the first ejection, ejection was performed without generation of missing dots due to, for example, nozzles turned into a non-ejection state, and good images were obtained; however, after 4 minutes elapsed from the termination of the first ejection, ejection was performed with slight generation of missing dots that did not bring practical problems.

D: Even before 3 minutes elapsed from the termination of the first ejection, ejection was performed with generation of missing dots due to, for example, nozzles turned into a non-ejection state, and the images were not practically acceptable.

Preservation Stability of Colorless Inks

As one of indexes of the dispersion stability of the colorless inks, the preservation stability of the colorless inks was evaluated.

Such a colorless ink was sealed within a container, and kept at 60° C. for 2 weeks.

After the lapse of 2 weeks, the colorless ink was subjected to the same evaluation test as with the evaluation test of ejectability, and the preservation stability of the colorless ink was evaluated in accordance with the same evaluation grades as in the evaluation test of ejectability.

In the above-described evaluation grades, Grade A means that the colorless ink has the highest preservation stability. In the above-described evaluation grades, Grades that are practically acceptable are A, B, and C.

TABLE 3-1

| | Materials of microcapsules (unit of amount: g) | | | | | | | |
|---|---|---|---|---|---|---|---|---|
| | Shell materials | | | | | | Core materials | |
| | Material for introducing nonionic group or Comparative material | | Material for introducing anionic group | | Other shell materials | | Thermal-polymerizable compounds | Thermal curing accelerator |
| | Type | Amount | Type | Amount | D-110N | D-120N | Blocked isocyanate A | Epoxy resin A | 2-Methylimidazole |
| Example 1 | D-116N | 16.5 | lysine | 3.3 | — | — | — | 10 | 7.1 |
| Example 2 | D-116N | 18.5 | lysine | 1.9 | — | — | — | 10 | 7.1 |
| Example 3 | D-116N | 9 | lysine | 3.4 | — | — | — | 10 | 7.1 |
| Example 4 | D-116N | 16.5 | β-Alanine | 3.3 | — | — | — | 10 | 7.1 |
| Example 5 | D-116N | 16.5 | lysine | 3.3 | — | — | 17.1 | — | — |
| Example 6 | D-116N | 4 | lysine | 3.3 | 7.5 | — | — | 10 | 7.1 |
| Example 7 | D-116N | 6.4 | COOH—NCO-1 | 5.1 | — | 4.6 | 10.5 | — | — |
| Example 8 | D-116N | 16.5 | taurine | 2.1 | — | — | — | 10 | 7.1 |
| Example 9 | D-116N | 16.5 | EAP | 2.8 | — | — | — | 10 | 7.1 |
| Example 10 | D-116N | 6.4 | COOH—NCO-2 | 5.1 | — | 4.6 | 10.5 | — | — |
| Example 11 | D-116N | 6.4 | COOH—NCO-3 | 5.1 | — | 4.6 | 10.5 | — | — |
| Comparative Example 1 | — | — | lysine | 3.3 | 11 | 0 | — | 10 | 7.1 |
| Comparative Example 2 | — | — | lysine | 3.3 | 11 | 0 | 17.1 | — | — |
| Comparative Example 3 | PEG1000 diamine | 4 | lysine | 3.3 | 7.5 | 0 | — | 10 | 7.1 |
| Comparative Example 4 | PTMG 1000 | 4 | lysine | 3.3 | 7.5 | 0 | 17.1 | — | — |

TABLE 3-2

|  | Amount (N) of specified nonionic group (mass %) | Amount (A) of anionic group (mmol/g) | A/N | Pencil hardness | Adhesion | Ejectability | Preservation stability |
|---|---|---|---|---|---|---|---|
| Example 1 | 14.4 | 0.79 | 0.055 | F | B | A | A |
| Example 2 | 16.4 | 0.46 | 0.028 | F | B | B | B |
| Example 3 | 9.0 | 0.93 | 0.103 | F | B | B | B |
| Example 4 | 14.4 | 1.29 | 0.090 | F | B | A | A |
| Example 5 | 14.4 | 0.79 | 0.055 | 2H | A | A | A |
| Example 6 | 13.3 | 0.75 | 0.056 | F | B | A | B |
| Example 7 | 8.4 | 0.34 | 0.040 | 2H | A | A | B |
| Example 8 | 15.0 | 0.61 | 0.041 | F | B | B | B |
| Example 9 | 14.7 | 1.41 | 0.096 | F | B | B | B |
| Example 10 | 8.4 | 0.33 | 0.039 | 2H | A | A | B |
| Example 11 | 8.4 | 0.31 | 0.037 | 2H | A | A | B |
| Comparative Example 1 | 0.0 | 0.79 | — | F | C | C | C |
| Comparative Example 2 | 0.0 | 0.79 | — | F | C | C | C |
| Comparative Example 3 | 0.0 | 0.75 | — | F | C | C | C |
| Comparative Example 4 | 0.0 | 0.75 | — | F | C | C | C |

As described in Tables 3-1 and 3-2, in each of Examples 1 to 11, an aqueous dispersion is employed that contains water and microcapsules including a core and a shell having a three-dimensionally crosslinked structure including (a) at least one selected from the group consisting of a urethane bond and a urea bond and (b) an anionic group and a specified nonionic group (namely, the group (W)) as hydrophilic groups, wherein at least one of the shell or the core has a thermal-polymerizable group; in each of these Examples, the cured film has high pencil hardness, and has high ejectability and high preservation stability (namely, dispersion stability of the aqueous dispersion).

By contrast, in Comparative Examples 1 and 2 in which the three-dimensionally crosslinked structures of the shells do not include nonionic groups, and Comparative Examples 3 and 4 in which the three-dimensionally crosslinked structures of the shells do not include specified nonionic groups but include nonionic groups other than specified nonionic groups, the ejectability and the preservation stability (namely, dispersion stability of the aqueous dispersion) were degraded.

Comparisons between Examples 1, 4, 8, and 9 have revealed the following: when the anionic group of the shells is a carboxy group (Examples 1 and 4), the aqueous dispersion has high dispersion stability, compared with the case where the anionic group of the shells is a sulfo group or a phosphoric acid group (Examples 8 and 9).

Comparisons of Examples 5, 7, 10, and 11 with the other Examples have revealed the following: when the thermal-polymerizable group is a blocked isocyanate group, the cured film has very high pencil hardness.

Examples 101 to 107

Production of Color Inks

The aqueous dispersions of microcapsules in Examples 1 and 5 were used to produce color inks as ink-jet inks.

Specifically, the components in Table 4 were mixed to produce the color inks.

The produced color inks, which are another form of the aqueous dispersion of microcapsules according to this embodiment, are referred to as "color inks" here, as being different from the aqueous dispersions of microcapsules produced in the above-described Examples.

The produced color inks were evaluated as in the above-described evaluations of adhesion, ejectability, and preservation stability for the colorless inks. The results are described in Table 4.

TABLE 4

| | Components of color ink (unit of amount: g) | | | | | | | | | |
|---|---|---|---|---|---|---|---|---|---|---|
| | Aqueous dispersion of microcapsules | | Pigment dispersion | | Nonionic surfactant | | Anionic surfactant | | Another additive | |
| | Type | Amount | Type | Amount | Type | Amount | Type | Amount | Type | Amount |
| Example 101 | Example 1 | 34.3 | Cab-o-jet 450 cyan pigment | 10 | Capstone FS-3100 | 0.45 | — | — | Tego Twin 4000 | 0.15 |
| Example 102 | Example 1 | 34.3 | Cab-o-jet 450 cyan pigment | 10 | — | — | Alkanol XC | 1 | — | — |
| Example 103 | Example 1 | 34.3 | Cab-o-jet 450 cyan pigment | 10 | — | — | Alkanol XC | 1.5 | — | — |

TABLE 4-continued

| | | | | | | | | | | |
|---|---|---|---|---|---|---|---|---|---|---|
| Example 104 | Example 5 | 82 | Pro-jet Cyan APD1000 | 13 | Capstone FS-31 | 0.3 | — | — | — | — |
| Example 105 | Example 5 | 82 | Pro-jet Cyan APD1000 | 13 | Capstone FS-31 | 0.3 | Sodium dodecyl sulfate | 0.4 | — | — |
| Example 106 | Example 5 | 82 | Pro-jet Cyan APD1000 | 13 | Capstone FS-31 | 0.3 | LAVELIN FP | 0.3 | — | — |
| Example 107 | Example 5 | 82 | Pro-jet Cyan APD1000 | 13 | Capstone FS-31 | 0.3 | Sodium dodecyl sulfate | 1.5 | — | — |

| | Components of color ink (unit of amount: g) | | | Evaluation results of color ink | | |
|---|---|---|---|---|---|---|
| | Solvent | | | | | Preservation |
| | Type | Amount | Water | Adhesion | Ejectability | stability |
| Example 101 | Glycerol | 5 | 50.1 | B | A | A |
| Example 102 | Glycerol | 5 | 49.7 | B | B | A |
| Example 103 | Glycerol | 5 | 49.2 | B | B | B |
| Example 104 | 2-Methyl propanediol | 4.7 | — | B | A | A |
| Example 105 | 2-Methyl propanediol | 4.3 | — | B | B | A |
| Example 106 | 2-Methyl propanediol | 4.4 | — | B | B | A |
| Example 107 | 2-Methyl propanediol | 3.2 | — | B | B | B |

Descriptions for Table 4

Cab-o-jet 450C cyan pigment: anionic self-dispersible cyan pigment dispersion (solid content concentration: 15 mass %, medium: water) manufactured by Cabot Corporation Pro-jet Cyan APD1000: cyan pigment dispersion (solid content concentration: 14 mass %, medium: water) manufactured by FUJIFILM (registered trademark) Imaging Colorants, Inc.

Capstone FS-3100: fluorosurfactant (nonionic surfactant) (solid content concentration: 100 mass %) from E. I. du Pont de Nemours and Company Capstone FS-31: fluorosurfactant (nonionic surfactant) (solid content concentration: 25 mass %, medium: water) from E. I. du Pont de Nemours and Company Alkanol XC: anionic surfactant (solid content concentration: 100 mass %) from E. I. du
Pont de Nemours and Company LAVELIN FP: anionic surfactant (solid content concentration: 100 mass %) manufactured by DAI-ICHI KOGYO SEIYAKU CO., LTD.

Tego Twin 4000: siloxane-based additive (solid content concentration: 100 mass %) manufactured by Evonik Degussa Japan Co., Ltd.

As described in Table 4, Examples 101 to 107 all provide good results of evaluations of adhesion, ejectability, and preservation stability.

In particular, Examples 101, 102, and 104 to 106 in which the anionic surfactant contents were 1 mass % or less achieve very high preservation stability.

The entire contents disclosed by JP2016-252731 filed in the Japan Patent Office on Dec. 27, 2016 are incorporated herein by reference.

All documents, patent applications, and technical standards mentioned in this Specification are incorporated herein by reference to the same extent as in the case where the individual documents, patent applications, and technical standards are specifically and individually described as being incorporated herein by reference.

What is claimed is:

1. An aqueous dispersion comprising:
a microcapsule including a core and a shell that has a three-dimensionally crosslinked structure including (a) at least one selected from the group consisting of a urethane bond and a urea bond and (b) an anionic group and a nonionic group as hydrophilic groups, wherein at least one of the shell or the core has a thermal-polymerizable group; and
water,
wherein the nonionic group is a group (W) represented by Formula (W) below,

Formula (W)

wherein, in Formula (W), $R^{W1}$ represents an alkylene group that has 1 to 6 carbon atoms and that may be branched, $R^{W2}$ represents an alkyl group that has 1 to 6 carbon atoms and that may be branched, nw represents an integer of 2 to 200, and * represents a linkage position.

2. The aqueous dispersion according to claim 1, wherein the three-dimensionally crosslinked structure includes at least one of structures represented by Formulas (X1) to (X4) below,

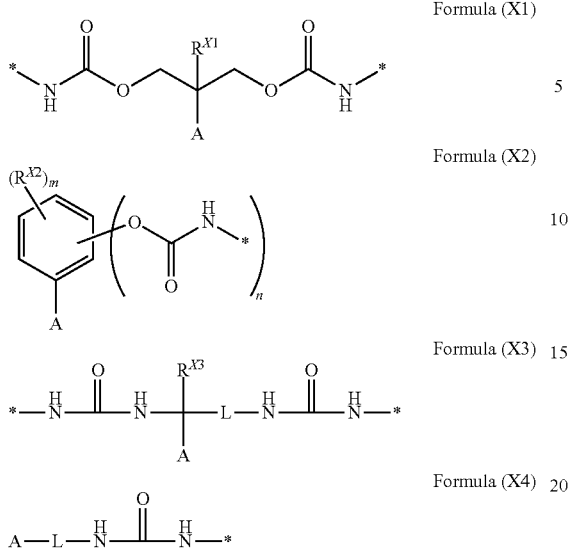

Formula (X1)

Formula (X2)

Formula (X3)

Formula (X4)

wherein, in Formula (X1), $R^{X1}$ represents a hydrogen atom or an alkyl group having 1 to 10 carbon atoms, A represents an anionic group, and * represents a linkage position, wherein, in Formula (X2), $R^{X2}$ represents an alkyl group having 1 to 10 carbon atoms, A represents an anionic group, n represents an integer of 1 to 5, m represents an integer of 0 to 4, m and n are in total an integer of 1 to 5, and * represents a linkage position, wherein, in Formula (X3), $R^{X3}$ represents a hydrogen atom or an alkyl group having 1 to 10 carbon atoms, A represents an anionic group, L represents a divalent linking group, and * represents a linkage position, and wherein, in Formula (X4), A represents an anionic group, L represents a divalent linking group, and * represents a linkage position.

3. The aqueous dispersion according to claim 1, wherein the anionic group is at least one of a carboxy group or a salt of a carboxy group.

4. The aqueous dispersion according to claim 1, wherein an amount of the nonionic group relative to a total solid content of the microcapsule is 1 mass % to 20 mass %.

5. The aqueous dispersion according to claim 1, wherein an amount of the anionic group relative to 1 g of a total solid content of the microcapsule is 0.2 mmol/g to 1.5 mmol/g.

6. The aqueous dispersion according to claim 1, wherein N mass % representing an amount of the nonionic group relative to a total solid content of the microcapsule, and A mmol/g representing an amount of the anionic group relative to 1 g of the total solid content of the microcapsule satisfy a ratio of A to N of 0.02 to 0.15.

7. The aqueous dispersion according to claim 1, wherein the core includes a thermal-polymerizable compound.

8. The aqueous dispersion according to claim 1, wherein a content of an anionic surfactant relative to a total amount of the aqueous dispersion is 1 mass % or less.

9. The aqueous dispersion according to claim 1, wherein an amount of a total solid content of the microcapsule relative to a total solid content of the aqueous dispersion is 50 mass % or more.

10. The aqueous dispersion according to claim 1, being used as an ink-jet ink.

11. A method for producing the aqueous dispersion according to claim 1, the method comprising:
  mixing (a) an aqueous-phase component including water and (b) an oil-phase component including an organic solvent, a tri- or higher functional isocyanate compound, and at least one of a thermal-polymerizable-group-introduced isocyanate compound or a thermal-polymerizable compound, and performing emulsification to form the microcapsule,
  wherein at least one of Condition (x-1) or Condition (x-2) below is satisfied,
    Condition (x-1): the oil-phase component includes an isocyanate compound to which the nonionic group is introduced,
    Condition (x-2): at least one of the oil-phase component or the aqueous-phase component includes a compound having the nonionic group and an active hydrogen group; and
  wherein at least one of Condition (y-1) or Condition (y-2) below is satisfied,
    Condition (y-1): the oil-phase component includes an isocyanate compound to which the anionic group is introduced,
    Condition (y-2): at least one of the oil-phase component or the aqueous-phase component includes a compound having the anionic group and an active hydrogen group.

12. An image-forming method comprising:
  applying the aqueous dispersion according to claim 1 onto a recording medium; and
  curing the aqueous dispersion applied on the recording medium by heating or irradiation with infrared radiation.

* * * * *